Figure 1:
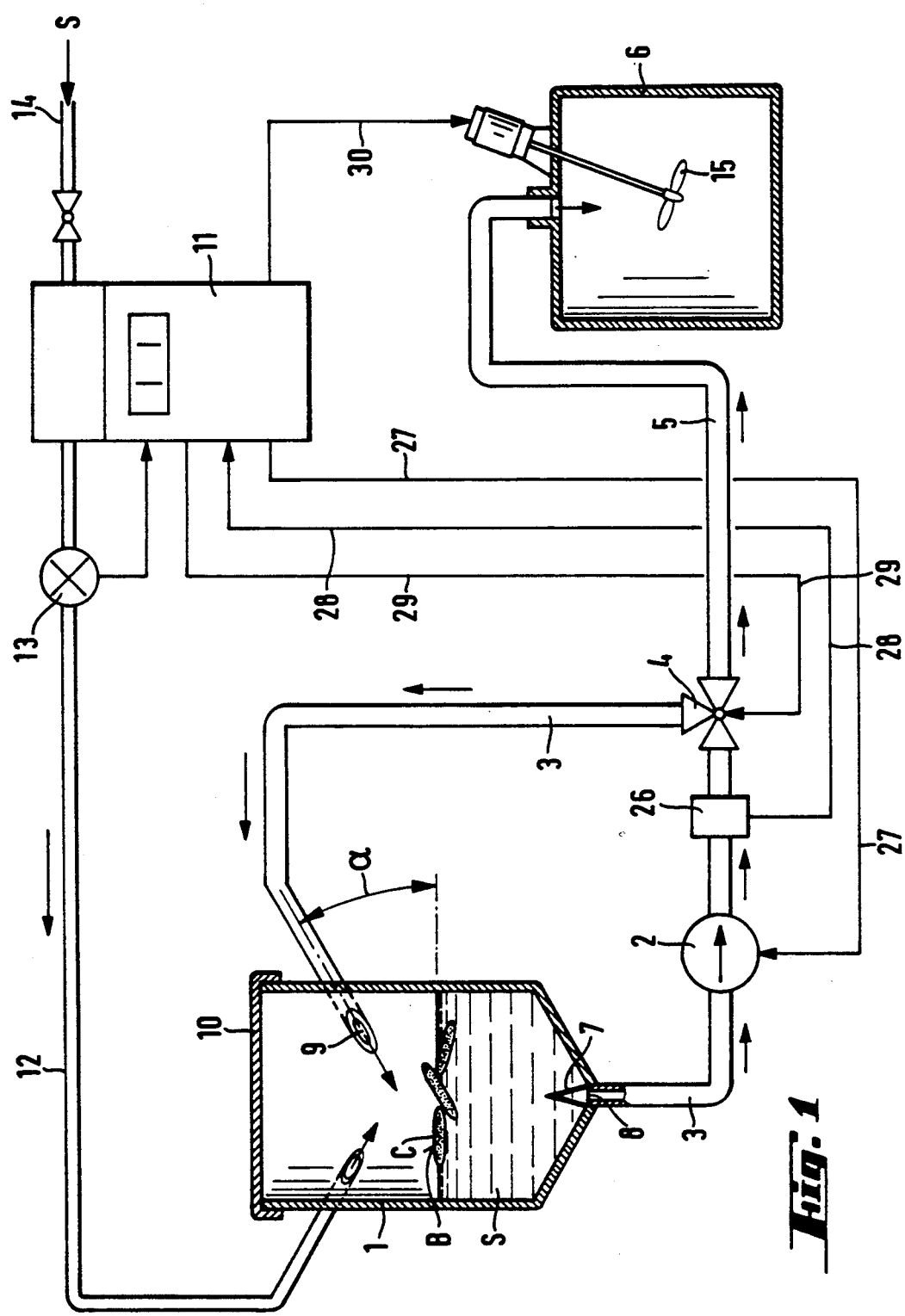

United States Patent [19]

Lacroix et al.

[11] Patent Number: 5,145,484
[45] Date of Patent: Sep. 8, 1992

[54] POLYVINYL ALCOHOL ENVELOPES OF LOW AIR CONTENT AS PACKING MATERIAL FOR FIBRE-REACTIVE DYES

[75] Inventors: Roger Lacroix, Village-Neuf, France; Ulrich Strahm, Aesch, Switzerland

[73] Assignee: Ciba-Geigy Corporation, Ardsley, N.Y.

[21] Appl. No.: 677,723

[22] Filed: Mar. 29, 1991

[30] Foreign Application Priority Data

Apr. 3, 1990 [CH]  Switzerland ........................ 1103/90
Aug. 17, 1990 [CH]  Switzerland ........................ 2683/90

[51] Int. Cl.$^5$ ............................................. C09B 67/02
[52] U.S. Cl. ............................................. 8/524; 8/436; 8/437; 8/543; 8/549; 8/552; 8/917; 8/918; 8/924; 8/926; 8/159; 428/34.1
[58] Field of Search ........................... 8/524, 543, 549

[56] References Cited

U.S. PATENT DOCUMENTS

| | | | |
|---|---|---|---|
| 4,046,507 | 9/1977 | Zweifel et al. | 8/526 |
| 4,295,850 | 10/1981 | Haberli et al. | 8/524 |
| 4,560,388 | 12/1985 | Rohrer | 8/543 |

*Primary Examiner*—A. Lionel Clingman
*Attorney, Agent, or Firm*—Edward McC. Roberts

[57] ABSTRACT

The invention relates to a stable, dust-free commercial form comprising at least one water-soluble monoreactive dye which comprises a monofluoro-s-triazine reactive radical, and/or at least one water-soluble polyreactive dye in a polyvinyl alcohol envelope.

The dyeings obtained with the stable, dust-free commercial form are distinguished by good general fastness properties.

13 Claims, 2 Drawing Sheets

POLYVINYL ALCOHOL ENVELOPES OF LOW AIR CONTENT AS PACKING MATERIAL FOR FIBRE-REACTIVE DYES

The invention relates to a novel commercial form of fibre-reactive dyes, processes for the preparation of this commercial form and to their use. The novel commercial form is a polyvinyl alcohol envelope, in particular in the form of a bag, comprising at least one monoreactive fluoro-s-triazine reactive dye and/or at least one polyreactive dye.

The packing of a wide range of products in plastic envelopes has been known for a long time. These packs (bags) are also advantageous for dyes, since they facilitate metering of the dyes without dust formation. In particular in the case of fibre-reactive dyes, metering in the form of pulverulent bulk material is undesirable. For some fibre-reactive dyes, packing in a polyvinyl alcohol envelope which dissolves in an aqueous dye bath and thus allows metering of the dyes without dust formation and without skin contact is already known. These are reactive dyes whose fibre-reactive group has only low or medium reactivity. Furthermore, only reactive dyes having a single fibre-reactive radical have been packed in polyvinyl alcohol envelopes.

It is also known that the strength of a polyvinyl alcohol envelope depends on its water content. In order to ensure an atmosphere of constant humidity, a hydrated salt is admixed to the dye in the polyvinyl alcohol envelope.

The fact that in the case of a high relative humidity this humidity can diffuse through the polyvinyl alcohol envelope into the dye powder and that a certain constant humidity in the surroundings of the polyvinyl alcohol envelope is necessary to ensure a given tearing strength have contributed to the fact that the highly reactive dyes disclosed in the last few years and also polyreactive dyes are not supplied in a pack mode of polyvinyl alcohol, since, as is known, an excessively high moisture content can diminish the reactivity of the dye packed in this manner, for example by hydrolysis, and metering cannot take place in a reproducible manner. Furthermore, in the case of dyes whose reactive group has high reactivity, a possible reaction with the polyvinyl alcohol cannot be excluded.

Accordingly, the object of the present invention is to find a pack for certain highly reactive dyes which ensures constant reactivity of the dyes over a long period of time.

It was found that the novel commercial form achieves this object.

The present invention relates to a stable, dust-free commercial form comprising at least one water-soluble monoreactive dye which comprises a monofluoro-s-triazine reactive radical, and/or at least one water-soluble polyreactive dye in a polyvinyl alcohol envelope.

According to the present invention, the packing material used is a water-soluble polyvinyl alcohol envelope. This envelope, which can also be called a film, preferably in the form of a bag, should, without being attacked, take up either a monoreactive dye having a single fibre-reactive fluoro-s-triazine group or at least one fibre-reactive dye having at least two reactive radicals of any desired type (polyreactive dye) or a mixture comprising at least one dye having a single fluoro-s-triazine group and at least one polyreactive dye. After dipping the envelope sealed on all sides into an aqueous solution, the envelope should easily dissolve.

The polyvinyl alcohol envelope to be used according to the invention as packing material is colourless, transparent, printable and readily degradable. The envelopes are soluble in water. The commercially available polyvinyl alcohols usually contain 0.5 to 2% of ester groups which originate from incomplete hydrolysis during the preparation process by hydrolysis of polyvinyl acetate and do not exert any influence on the characteristic properties of the polyvinyl alcohol. Polyvinyl alcohols having a higher acetate content, which are prepared by partial hydrolysis of polyvinyl acetate, still have sufficient water solubility. Thus, envelopes having a polyvinyl acetate content between 0 and 20% are suitable.

To prepare polyvinyl alcohol envelopes (for example in the form of bags or sacks), the methods customary in industry can be used. Thus, for example, the polyvinyl alcohol envelope can be heat-sealed, or produced in any other manner desired. Thus, for example, a flexible polyvinyl alcohol strip can be inserted into a filling or packing machine, shaped into a tube, filled with dye powder or granules and shaped into a sealed container by compaction. Furthermore, larger envelopes can be tied with polyvinyl alcohol string.

The thickness of the polyvinyl alcohol envelope usable according to the invention for the pack is between 25 and 70 $\mu$m, in particular between 25 and 40 $\mu$m. Thinner envelopes do not have the required tensile strength for bearing the weight of the pack contents without tearing, while thicker envelopes are uneconomical and may be difficult to dissolve. The individual polyvinyl alcohol envelopes can be accommodated in a suitable shipping container for storage for shipping, it being advantageous to provide the shipping containers with a lining which, as a rule, is water-insoluble. Examples of suitable linings are those made of polyvinyl chloride, polyester or polypropylene. The advantage of this type of packing is that the polyvinyl alcohol envelopes are packed airtight and thus moisturetight, thus avoiding dissolution of the polyvinyl alcohol envelopes in moist air and, on the other hand, preventing excessive drying of the polyvinyl alcohol envelope and protecting the envelopes against exposure to steam and water.

Preference is given to a commercial form comprising at least one monoreactive dye of the formula

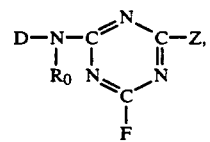

(1)

in which D is the radical of an organic dye from the monoazo or polyazo, metal complex azo, anthraquinone, phthalocyanine, formazan, azomethine, nitroaryl, dioxazine, phenazine, stilbene, triphenylmethane, xanthene, thioxanthone, naphthoquinone, pyrenequinone or perylenetetracarbimide series, $R_0$ is hydrogen or substituted or unsubstituted $C_1$–$C_4$alkyl, and Z is a substituted or unsubstituted amino group, a substituted or unsubstituted mercapto group, a substituted or unsubstituted hydroxyl group or a substituted or unsubstituted hydrocarbon radical.

$R_0$ in formula (1) $C_1$–$C_4$alkyl can be further substituted, for example by halogen, such as fluorine, chlorine or bromine, hydroxyl, cyano, $C_1$–$C_4$alkoxy, such as methoxy and ethoxy, carboxyl, sulfato or sulfo. Examples of $R_0$ are: methyl, ethyl, propyl, isopropyl, butyl, isobutyl, sec-butyl, tert-butyl, carboxymethyl, $\beta$-carboxyethyl, $\beta$-carboxypropyl, methoxycarbonylmethyl, ethoxycarbonylmethoxyl, $\beta$-methoxyethyl, $\beta$-ethoxyethyl, $\beta$-methoxypropyl, $\beta$-chloroethyl, $\gamma$-chloropropyl, $\gamma$-bromopropyl, $\beta$-hydroxyethyl, $\beta$-hydroxybutyl, $\beta$-cyanoethyl, sulfomethyl, $\beta$-sulfoethyl and $\beta$-sulfatoethyl.

The dyes of the formula (1) contain a single fibre-reactive radical, namely the monofluoro-s-triazine radical. Fibre-reactive compounds are understood to mean those which are capable of reacting with the hydroxyl groups of cellulose or with the amino, hydroxyl or mercapto groups of natural or synthetic polyamides with the formation of covalent chemical bonds.

The dyes of the formula (1) are known per se and are prepared in analogy to known processs. Thus, for example, the radical $DN(R_0)H$ is reacted with a 4,6-difluoro-s-triazine which is substituted in the 2 position by the substituent Z.

4,6-Difluoro-s-triazines substituted in the 2-position are obtained, for example, by reacting trifluoro-s-triazines with the amino, hydroxyl or mercapto compounds mentioned. The substituent in the 2-position of a 4,6-difluoro-s-triazine can be, for example, the radical of one of the amino, hydroxyl and mercapto compounds mentioned below:

ammonia, methylamine, dimethylamine, ethylamine, diethylamine, propylamine, isopropylamine, butylamine, dibutylamine, isobutylamine, sec-butylamine, tert-butylamine, hexylamine, methoxyethylamine, ethoxyethylamine, methoxypropylamine, chloroethylamine, hydroxyethylamine, dihydroxyethylamine, hydroxypropylamine, aminoethanesulfonic acid, $\beta$-sulfatoethylamine, benzylamine, cyclohexylamine, aniline, o-, m- or p-toluidine, 2,3-, 2,4-, 2,5-, 2,6-, 3,4- and 3,5-dimethylaniline, o-, m- and p-chloroaniline, N-methylaniline, N-ethylaniline, 3- or 4-acetylaminoaniline, 2,5-dimethoxyaniline, o-, m- and p-anisidine, o-, m- and p-phenetidine, 1-naphthylamine, 2-naphthylamine, 2-amino-1-hydroxynaphthalene, 1-amino-4-hydroxynaphthalene, 1-amino-8-hydroxynaphthalene, 1-amino-2-hydroxynaphthalene, 1-amino-7-hydroxynaphthalene, orthanilic acid, metanilic acid, sulfanilic acid, aniline-2,4-disulfonic acid, aniline-2,5-disulfonic acid, anthranilic acid, m- and p-aminobenzoic acid, 2-aminotoluene-4-sulfonic acid, 2-aminotoluene-5-sulfonic acid, p-aminosalicylic acid, 1-amino-4-carboxybenzene-3-sulfonic acid, 1-amino-2-carboxybenzene-5-sulfonic acid, 1-amino-5-carboxybenzene-2-sulfonic acid, 1-naphthylamine-2-, -3-, -4-, -5-, -6-, -7- and -8-sulfonic acid, 2-naphthylamine-1-, -3-, -4-, -6-, -7- and -8-sulfonic acid, 1-naphthylamine-2,4-, -2,5-, -2,7-, -2,8-, -3,5-, -3,6-, -3,7-, -3,8-, -4,6-, -4,7-, -4,8-, and -5,8-disulfonic acid, 2-naphthylamine-1,5-, -1,6-, -1,7-, -3,6-, -3,7-, -4,7-, -4,8-, -5,7- and -6,8-disulfonic acid, 1-naphthylamine-2,4,6-, -2,4,7-, -2,5,7-, -3,5,7-, -3,6,8- and -4,6,8-trisulfonic acid, -2-naphthylamine-1,3,7-, -1,5,7-, -3,5,7-, -3,6,7-, -3,6,8- and -4,6,8-trisulfonic acid, 2-, 3- and 4-aminopyridine, 2-aminobenzothiazole, 5-, 6-and 8-aminoquinoline, 2-aminopyrimidine, morpholine piperidine, piperazine, water, methanol, ethanol, propanol, isopropanol, n-butanol, isobutanol, sec-butanol, tert-butanol, hexanol, cyclohexanol, $\beta$-methoxyethanol, $\beta$-ethoxyethanol, $\gamma$-methoxypropanol, $\gamma$-ethoxypropanol, $\beta$-ethoxy-$\beta$-ethoxyethanol, glycolic acid, phenol, o-, m- and p-chlorophenol, o-, m- and p-nitrophenyol, o-, m- and p-hydroxybenzoic acid, o-, m- and p-phenolsulfonic acid, phenol-2,4-disulfonic acid, $\alpha$-naphthol, 1-hydroxynaphthalene-8-sulfonic acid, 2-hydroxynaphthalene-1-sulfonic acid, 1-hydroxynaphthalene-5-sulfonic acid, 1-hydroxynaphthalene-4-sulfonic acid, 1--hydroxynaphthalene-6- or -7-sulfonic acid, 2-hydroxynaphthalene-6-, -7- or -8-sulfonic acid, 2-hydroxynaphthalene-4-sulfonic acid, 2-hydroxynaphthalene-4,8- or -6,8-disulfonic acid, 1-hydroxynaphthalene-4,6-disulfonic acid, 2-hydroxynaphthalene-3,6-disulfonic acid, methanethiol, ethanethiol, propanethiol, isopropanethiol, n-butanethiol, thioglycolic acid, thiourea, thiophenol, $\alpha$-thionaphthol and $\beta$-thionaphthol.

The substituents in the 2-position of the triazine radical can also be introduced after reacting the 2,4,6-trifluoro-s-triazine with the amine $D—N(R_0)H$. Thus, it is, for example, possible to condense one of the abovementioned amino, hydroxyl or mercapto compounds afterwards with a dihalogeno-s-triazine radical already bound to the dye.

Examples of valuable aminofluorotriazines are:
2-amino-4,6-difluoro-s-triazine, 2-phenylamino-4,6-difluoro-s-triazine,
2-N-ethyl-N-phenylamino-4,6-difluoro-s-triazine,
2-(methylphenylamino)-4,6-difluoro-s-triazine,
2-(chlorophenylamino)-4,6-difluoro-s-triazine,
2-(sulfophenylamino)-4,6-difluoro-s-triazine,
2-N-methyl-N-(methylphenylamino)-4,6-difluoro-s-triazine,
2-N-methyl-N-(chlorophenylamino)-4,6-difluoro-s-triazine,
2-N-methyl-N-(sulfophenylamino)-4,6-difluoro-s-triazine,
2-(2'-chloro-5'-sulfophenylamino)-4,6-difluoro-s-triazine and
2-(sulfonaphthylamino)-4,6-difluoro-s-triazine.

Particular preference is given to a commercial form comprising a dye of the formula (1), in which Z is —$NH_2$ or the radical of an aliphatic, aromatic or heterocylic amine, in particular in which Z is —$NH_2$, $C_1$-$C_4$alkylamino, $N,N$-di-$C_1$-$C_4$alkylamino, phenylamino, $N$—$C_1$-$C_4$alkyl-$N$-phenylamino or naphthylamino, in which the alkyl radicals can be substituted by $C_1$-$C_4$alkoxy, cyano, halogen, hydroxyl, sulfo or sulfato, and the phenyl or naphthyl radical can be substituted by $C_1$-$C_4$alkyl, $C_1$-$C_4$alkoxy, halogen, carboxyl or sulfo, or in which Z is morpholino.

Preference is also given to a commercial form comprising at least one bi-, tri- or tetrareactive dye. Bi-, tri- or tetrareactive dyes are understood to mean those dyes comprising two, three or four fibre-reactive groups of any desired type.

Particular preference is also given to a commercial form comprising at least one dye of the formula $$D\text{-}(X)_{2-4} \qquad (2),$$

in which D is the radical of an organic dye from the monoazo or polyazo, metal complex azo, anthraquinone, phthalocyanine, formazan, azomethine, nitroaryl, dioxazine, phenazine, stilbene, triphenylmethane, xanthene, thioxanthone, naphthoquinone, pyrenequinone or perylenetetracarbimide series, and —$(X)_{2-4}$ is 2, 3 or 4 fibre-reactive radicals X, which can be identical to or different from one another, from the aliphatic, aromatic or heterocyclic series, which are bound to D directly or via a bridging member.

Examples of suitable fibre-reactive radicals are those containing at least one detachable substituent bound to a heterocyclic, aromatic or aliphatic radical.

Examples of suitable fibre-reactive radicals are the radicals disclosed in EP-A-126 025.

Examples of suitable radicals D in the formula (1) and (2) are:

a) reactive dyes in which D is the radical of a formazan dye of the formula

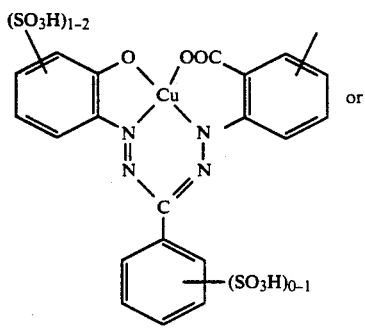
(3a)

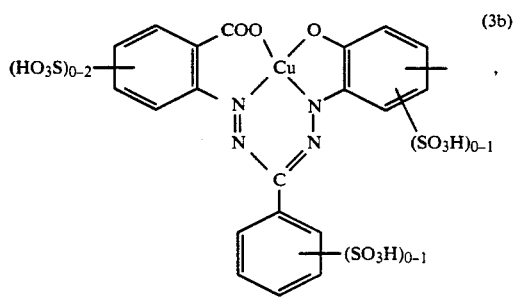
(3b)

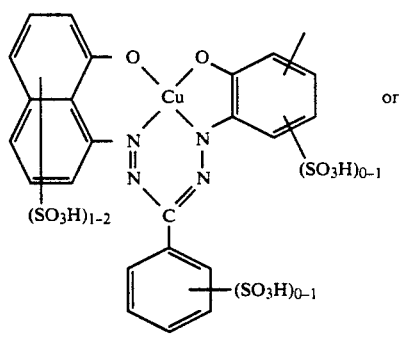
(3c)

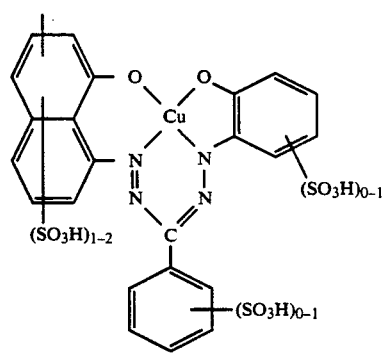
(3d)

in which the benzene rings can be furthermore substituted by alkyl having 1 to 4 C atoms, alkoxy having 1 to 4 C atoms, alkylsulfonyl having 1 to 4 C atoms, halogen or carboxyl.

b) Reactive dyes in which D is the radical of an anthraquinone dye of the formula

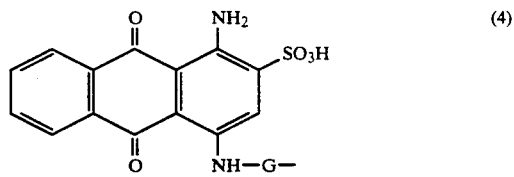
(4)

in which G is a phenylene, cyclohexylene, phenylenemethylene or $C_2$-$C_6$alkylene radical; it being possible for the anthraquinone ring to be substituted by a further sulfo group and G as phenyl radical to be substituted by alkyl having 1 to 4 C atoms, alkoxy having 1 to 4 C atoms, halogen, carboxyl or sulfo, and the dye preferably contains at least 2 sulfo groups.

c) Reactive dyes in which D is the radical of a phthalocyanine dye of the formula

(5)

in which Pc is the radical of a copper phthalocyanine or nickel phthalocyanine; W is —OH and/or —$NR_5R_{5'}$; $R_5$ and $R_{5'}$, independently of one another, are hydrogen or alkyl having 1 to 4 carbon atoms, which can be substituted by hydroxyl or sulfo; $R_4$ is hydrogen or alkyl having 1 to 4 carbon atoms; E is a phenylene radical which can be substituted by alkyl having 1 to 4 C atoms, halogen, carboxyl or sulfo; or is an alkylene radical having 2 to 6 C atoms, preferably a sulfophenylene or ethylene radical; and k is 1, 2 or 3.

d) Reactive dyes in which D is the radical of a dioxazine dye of the formula

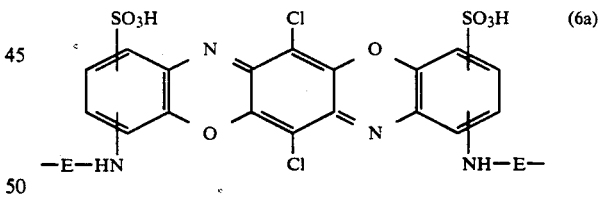
(6a)

or

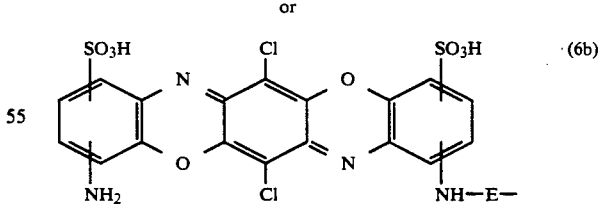
(6b)

or

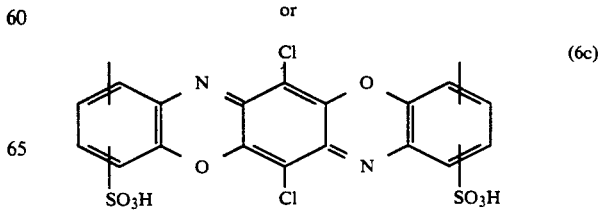
(6c)

in which E is a phenylene radical which can be substituted by alkyl having 1 to 4 C atoms, halogen, carboxyl or sulfo; or is an alkylene radical having 2 to 6 C atoms; and the outer benzene rings in the formulae (6a), (6b) and (6c) can be further substituted by alkyl having 1 to 4 C atoms, alkoxy having 1 to 4 C atoms, acetylamino, nitro, halogen, carboxyl, sulfo or —SO$_2$—Z′, in which Z′ is β-sulfatoethyl, β-thiosulfatoethyl, β-phosphatoethyl, β-acyloxyethyl, β-halogenoethyl or vinyl.

Reactive dyes in which D is a mono- or disazo dye radical of the formula

$$D_1-N=N-(M-N=N)_u-K- \qquad (7a),$$

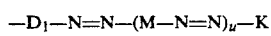

$$-D_1-N=N-(M-N=N)_u-K \qquad (7b)$$

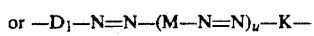

$$\text{or } -D_1-N=N-(M-N=N)_u-K- \qquad (7c),$$

or of a metal complex derived therefrom; $D_1$ is the radical of a diazo component from the benzene or naphthalene series, M is the radical of a middle component from the benzene or naphthalene series, and K is the radical of a coupling component from the benzene, naphthalene, pyrazolone, 6-hydroxy-2-pyridone or acetoarylamide series, in which $D_1$, M and K can carry the substituents customary for azo dyes, in particular hydroxyl, amino, methyl, ethyl, methoxy or ethoxy groups, substituted or unsubstituted alkanoylamino groups having 2 to 4 C atoms, substituted or unsubstituted benzoylamino groups, halogen atoms or a fibre-reactive radical, in particular —SO$_2$—Z′, in which Z′ is as defined; u is 0 or 1; and $D_1$, M and K together contain at least two sulfo groups, preferably three or four sulfo groups, are also of interest.

Reactive dyes in which D is a disazo dye radical of the formula

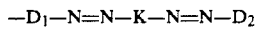

$$-D_1-N=N-K-N=N-D_2 \qquad (8a)$$

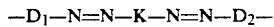

$$-D_1-N=N-K-N=N-D_2- \qquad (8b)$$

in which $D_1$ and $D_2$, independently of one another, are the radical of a diazo component from the benzene or naphthalene series and K is the radical of a coupling component from the naphthalene series; in which $D_1$, $D_2$ and K carry the substituents customary for azo dyes, in particular hydroxyl, amino, methyl, ethyl, methoxy or ethoxy groups, substituted or unsubstituted alkanoylamino groups having 2 to 4 C atoms, substituted or unsubstituted benzoylamino groups, halogen atoms or a fibre-reactive radical, in particular a radical —SO$_2$—Z′, in which Z′ is as defined, and $D_1$, $D_2$ and K together contain at least two sulfo groups, preferably three or four sulfo groups, are also of interest.

Of the interesting reactive dyes of the formulae (7a), (7b), (7c), (8a) and (8b), the dyes in which D is a dye radical of the formulae (9) and (11) to (21) below are particularly important:

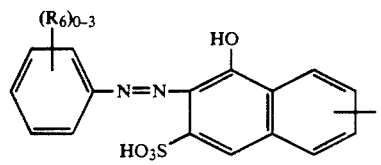

(9a)

or

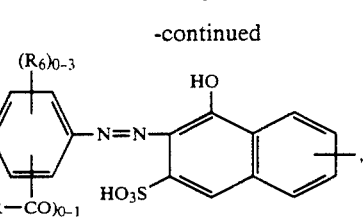

(9b)

in which $R_6$ is $C_1$-$C_4$alkyl, $C_1$-$C_4$alkoxy, halogen, —SO$_2$—Z′, carboxyl and sulfo; and Z′ is β-sulfatoethyl, β-thiosulfatoethyl, β-phosphatoethyl, β-acyloxyethyl, β-halogenoethyl or vinyl, and R is a radical of the formula

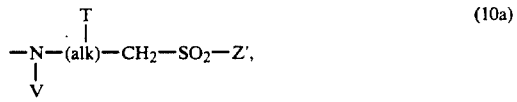

(10a)

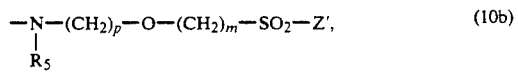

(10b)

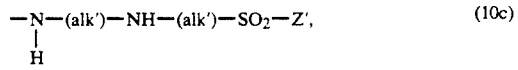

(10c)

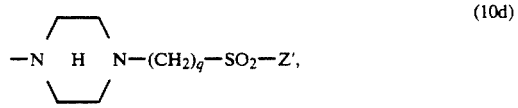

(10d)

Z′ is β-sulfatoethyl, β-thiosulfatoethyl, β-acyloxyethyl, β-halogenoethyl or vinyl; alk is an alkylene radical having 1 to 6 C atoms or branched isomers thereof; T is hydrogen, chlorine, bromine, fluorine, hydroxyl, sulfato, acyloxy having 1 to 4 C atoms, cyano, carboxyl, alkoxycarbonyl having 1 to 5 C atoms, carbamoyl, or a radical —SO$_2$—Z′, in which Z′ is as defined above; $R_5$ is hydrogen or $C_1$-$C_6$alkyl; V is hydrogen or an alkyl radical having 1 to 4 C atoms, which can be substituted by carboxyl or sulfo groups or by derivatives thereof, alkoxy groups having 1 to 2 C atoms, halogen or hydroxyl; or a radical

(10e)

in which Z′, alk and T are as defined; alk′, independently of one another, are polymethylene radicals having 2 to 6 C atoms or branched isomers thereof; and m is 1 to 6, p is 1 to 6 and q is 1 to 6;

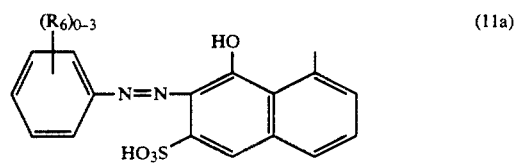

(11a)

or

-continued

β-thiosulfatoethyl, β-phosphatoethyl, β-acyloxyethyl, β-halogenoethyl or vinyl;

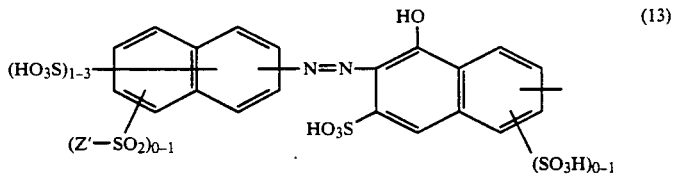
(13)

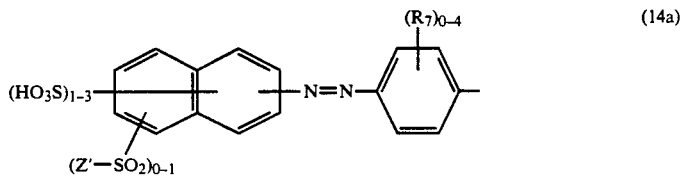
(14a)

or

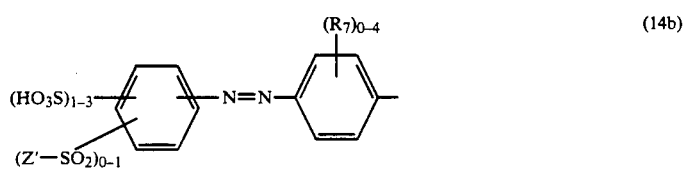
(14b)

or

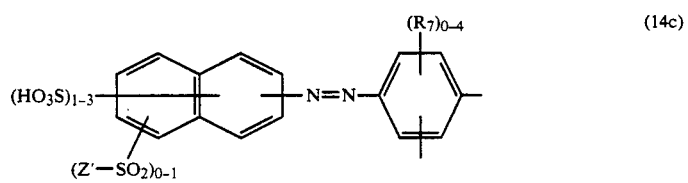
(14c)

or

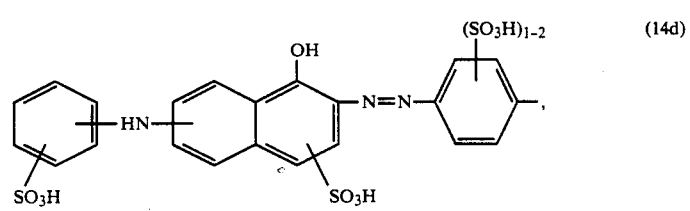
(14d)

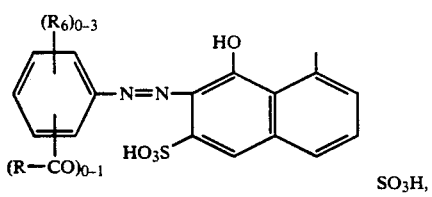
(11b)

in which R₆ is C₁-C₄alkyl, C₁-C₄alkoxy, halogen, —SO₂—Z', carboxyl, sulfo and C₁-C₄alkoxyanilino; and Z' is β-sulfatoethyl, β-thiosulfatoethyl, β-phosphatoethyl, β-acyloxyethyl, β-halogenoethyl or vinyl, and R is as defined under formulae (10a) to (10e);

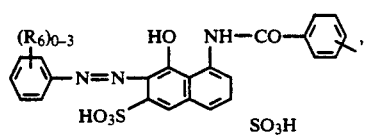
(12)

in which R₆ is C₁-C₄alkyl, C₁-C₄alkoxy, halogen, —SO₂—Z', carboxyl and sulfo; and Z' is β-sulfatoethyl, in which R₇ is halogen, nitro, cyano, trifluoromethyl, sulfamoyl, carbamoyl, C₁-C₄alkyl, C₁-C₄alkoxy, amino, acetylamino, ureido, hydroxyl, carboxyl, sulfomethyl and sulfo; and Z' is β-sulfatoethyl, β-thiosulfatoethyl, β-phosphatoethyl, β-acyloxyethyl, β-halogenoethyl or vinyl;

(15)

(16a)

or

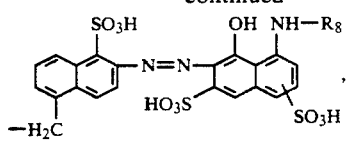 (16b)

in which $R_8$ is $C_1-C_4$alkanoyl or benzoyl; and $Z'$ is β-sulfatoethyl, β-thiosulfatoethyl, β-phosphatoethyl, β-acyloxyethyl, β-halogenoethyl or vinyl;

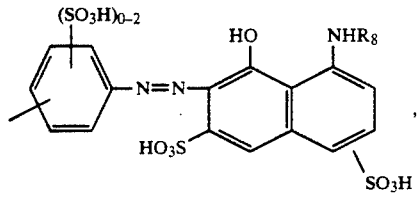 (17)

in which $R_8$ is $C_1-C_4$alkanoyl or benzoyl;

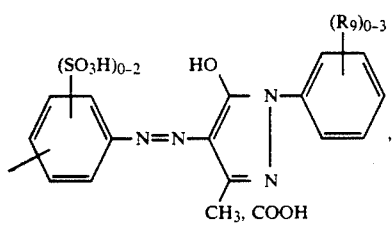 (18)

in which $R_9$ is $C_1-C_4$alkyl, $C_1-C_4$alkoxy, halogen, —$SO_2$—$Z'$, carboxyl and sulfo; and $Z'$ is β-sulfatoethyl, β-thiosulfatoethyl, β-phosphatoethyl, β-acyloxyethyl, β-halogenoethyl or vinyl;

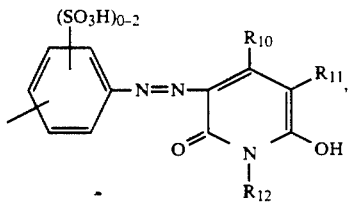 (19)

in which $R_{12}$ and $R_{10}$, independently of one another, are hydrogen, $C_1-C_4$alkyl or phenyl, and $R_{11}$ is hydrogen, cyano, carbamoyl or sulfomethyl;

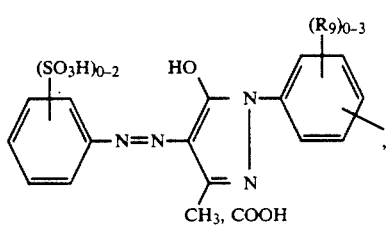 (20)

in which $R_9$ is $C_1-C_4$alkyl, $C_1-C_4$alkoxy, halogen, —$SO_2$—$Z'$, carboxyl and sulfo; and $Z'$ is β-sulfatoethyl, β-thiosulfatoethyl, β-phosphatoethyl, β-acyloxyethyl, β-halogenoethyl or vinyl;

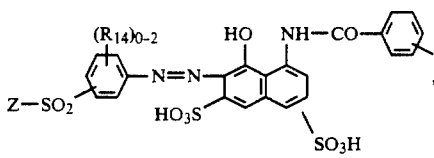 (21)

in which $R_{14}$ is $C_1-C_4$alkyl, $C_1-C_4$alkoxy, halogen, carboxyl and sulfo; and $Z'$ is β-sulfatoethyl, β-thiosulfatoethyl, β-phosphatoethyl, β-acyloxyethyl, β-halogenoethyl or vinyl;

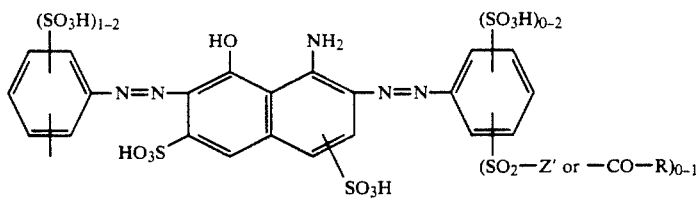 (21a)

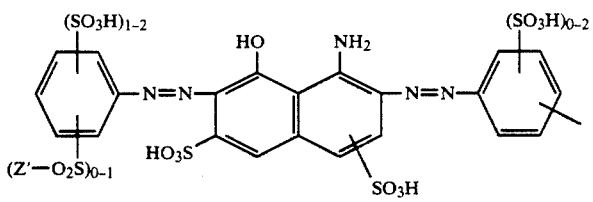 (21b)

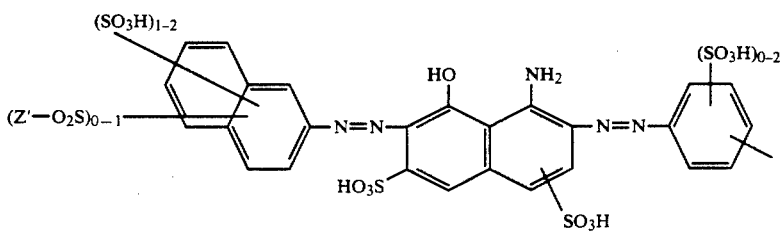 (21c)

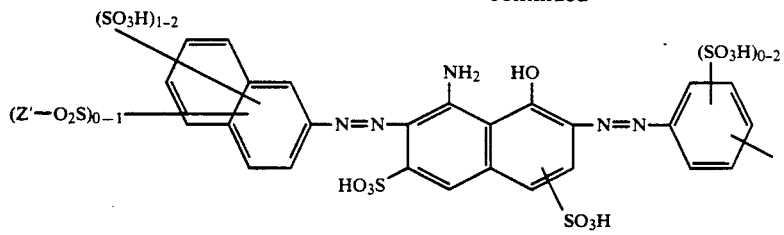
(21d)

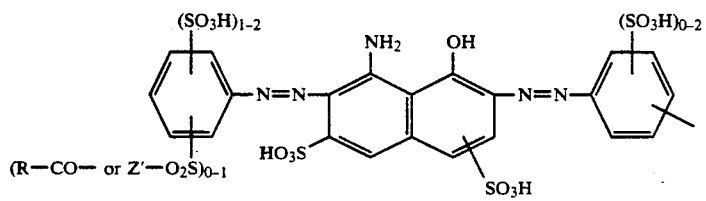
(21e)

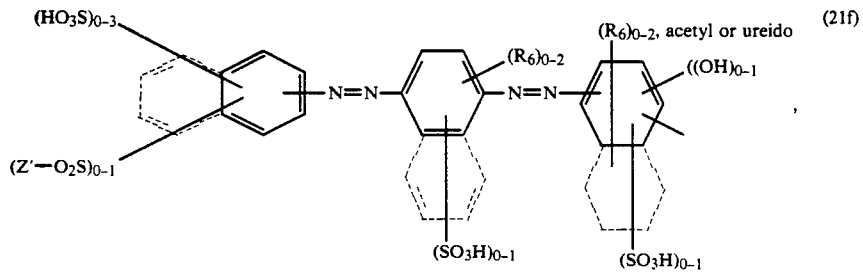
(21f)

in which $R_6$ and $Z'$ are as defined under formula (9b) and R is as defined under formulae (10a) to (10d).

Furthermore, heavy metal complexes of reactive dyes of the formulae (1) and (2) are particularly important; suitable complexing heavy metals are in particular copper, nickel, cobalt or chromium. Preference is given to copper complex azo dyes, in particular those of the formulae (9) and (11) to (21) which contain the copper atom bound via an oxygen atom in each case in the ortho-position relative to the azo bridge.

Examples of azo dyes which are suitable as metal complexes are:

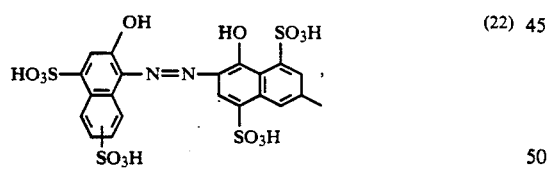
(22)

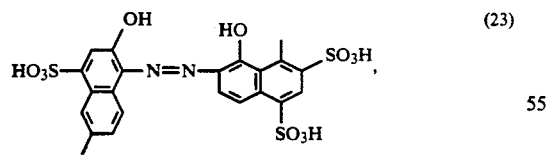
(23)

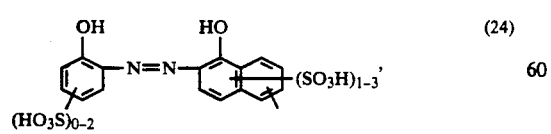
(24)

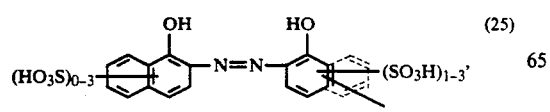
(25)

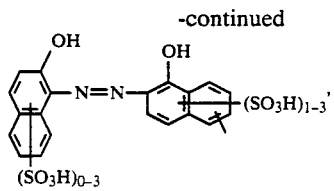
(26)

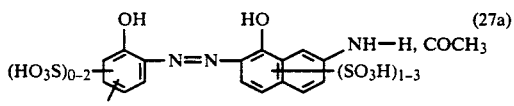
(27a)

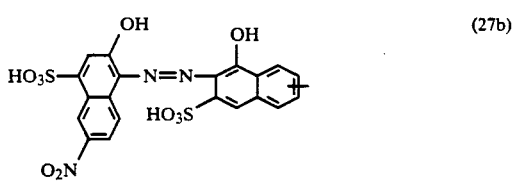
(27b)

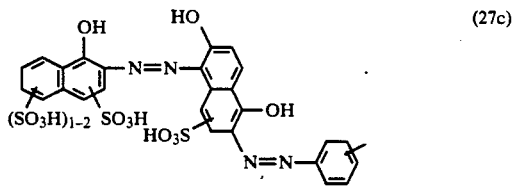
(27c)

Cu (1:1 complex) or Cr and Co (1:2 complex) are preferred as the metal atoms. Cr and Co complexes can contain the azo compound of the abovementioned formula once or twice, i.e. they can have a symmetrical or, together with any desired ligands, an asymmetrical structure.

Preference is given to copper complexes, for example

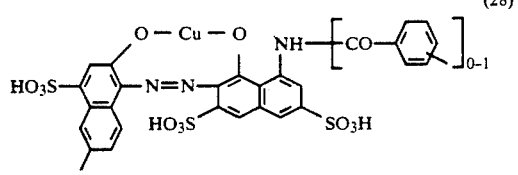

(28)

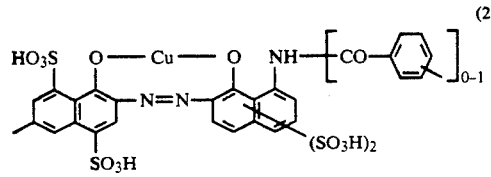

(29a)

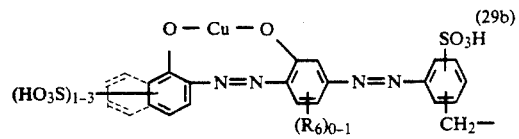

(29b)

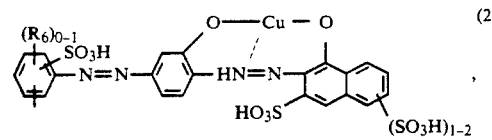

(29c)

in which $R_6$ is as defined under formula (9).

The aromatic rings in the above dyes can be further substituted, the benzene rings in particular by methyl, ethyl, methoxy, ethoxy, methylsulfonyl, ethylsulfonyl, carboxyl, acetylamino or chlorine, and the naphthalene rings in particular by methoxy, carboxyl, acetylamino, nitro or chlorine. The benzene rings are preferably not further substituted.

Very particular preference is given to a commercial form comprising at least one dye of the formulae

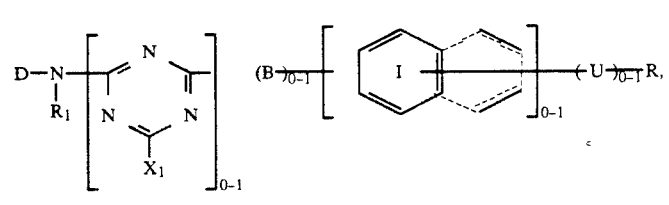

(30)

(31)

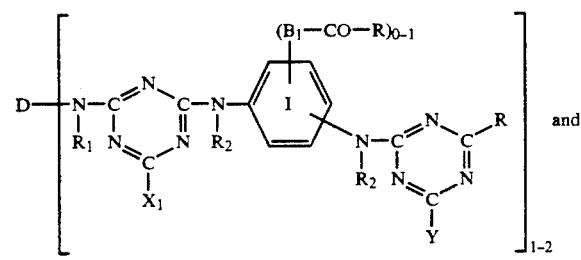

(32)

and

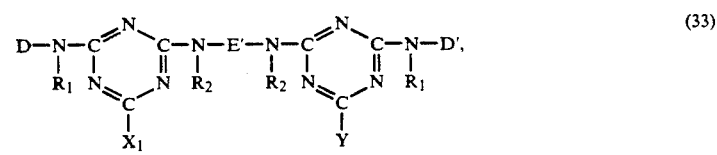

(33)

in which D and D', independently of one another, are each the radical of an organic dye from the monoazo, polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarbimide series, in particular in which D and D', independently of one another, are a radical of the formula (9) or (11) to (21), $R_1$ and $R_2$, independently of one another, are hydrogen, substituted or unsubstituted $C_1$-$C_4$alkyl or substituted or unsubstituted phenyl, $X_1$ and Y, independently of one another, are fluorine, chlorine, bromine, or a radical of the formulae

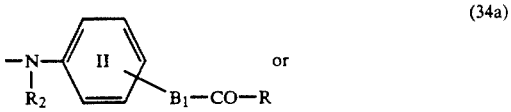

(34a)

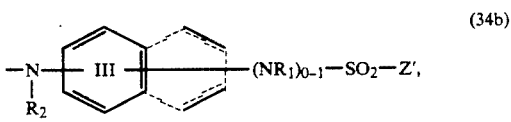

(34b)

B is a radical of the formula

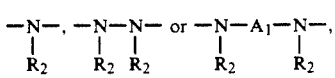

$A_1$ is an aliphatic or aromatic bridging member, such as mentioned for $A_2$ and $A_3$, U is —CO— or —$SO_2$—, $B_1$ is the direct bond —(CH$_2$)$_{1-6}$ or —O—(CH$_2$)$_{1-6}$, $Z_1$ is an aliphatic, aromatic or heterocyclic reactive radical, R is a radical of the formulae (10a) to (10d), and n and n' are each the number 1 or 2 and n+n' is 2, 3, or 4, E' is a radical of the formula

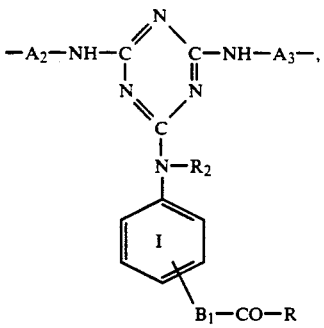

$A_2$ and $A_3$, independently of one another, are each a radical of the formula

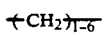 (36a)

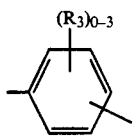 (36b)

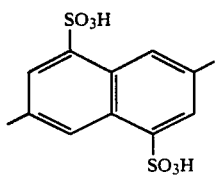 (36c)

or

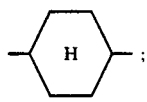 (36d)

or $X_1$ in formula (33) is a radical of the formula

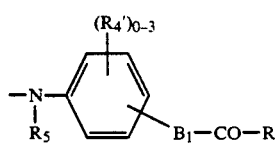 (37)

and E' is a radical of the formula (36a), (36b), (36c) or (36d); and $R_3$ and $R_4'$, independently of one another, are 0 to 3 substituents from the group comprising $C_{1-4}$alkyl, $C_{1-4}$alkoxy, halogen, carboxyl and sulfo;

and benzene rings I and II or benzene or naphthalene ring III, independently of one another, can contain further substituents.

The radical D and D' in the formulae (30) to (33) can contain the substituents customary for organic dyes bound to its basic structure.

Examples of further substituents in the radical D and D' are: alkyl groups having 1 to 4 carbon atoms, such as methyl, ethyl, propyl, isopropyl or butyl, alkoxy groups having 1 to 4 carbon atoms, such as methoxy, ethoxy, propoxy, isopropoxy or butoxy, acylamino groups having 1 to 8 carbon atoms, such as acetylamino, propionylamino or benzoylamino, amino, alkylamino having 1 to 4 carbon atoms, such as methylamino, ethylamino, propylamino, isopropylamino or butylamino, phenylamino, N,N-di-β-hydroxyethylamino, N,N-di-β-sulfatoethylamino, sulfobenzylamino, N,N-disulfobenzylamino, alkoxycarbonyl having 1 to 4 carbon atoms in the alkoxy radical, such as methoxycarbonyl or ethoxycarbonyl, alkylsulfonyl having 1 to 4 carbon atoms, such as methylsulfonyl or ethylsulfonyl, trifluoromethyl, nitro, cyano, halogen, such as fluorine, chlorine or bromine, carbamoyl, N-alkylcarbamoyl having 1 to 4 carbon atoms in the alkyl radical, such as N-methylcarbamoyl or N-ethylcarbamoyl, sulfamoyl, N-alkylsulfamoyl having 1 to 4 carbon atoms, such as N-methylsulfamoyl, N-ethylsulfamoyl, N-propylsulfamoyl, N-isopropylsulfamoyl or N-butylsulfamoyl, N-(β-hydroxyethyl)sulfamoyl, N,N-di-(β-hydroxyethyl)sulfamoyl, N-phenylsulfamoyl, ureido, hydroxyl, carboxyl, sulfomethyl or sulfo. The radical D and D' preferably contains one or ore sulfo groups. Reactive dyes of the formula (1) in which D or D' is the radical of an azo dye contain, as substituents, in particular methyl, ethyl, methoxy, ethoxy, acetylamino, benzoylamino, amino, chlorine, bromine, ureido, hydroxyl, carboxyl, sulfomethyl or sulfo.

Alkyl $R_1$ and $R_2$ are straight-chain or branched; they can be further substituted, for example by halogen, hydroxyl, cyano, $C_{1-4}$alkoxy, $C_{1-4}$alkoxycarbonyl, carboxyl, sulfamoyl, sulfo or sulfato. Examples of $R_1$ and $R_2$ are the following radicals: methyl, ethyl, propyl, isopropyl, butyl, isobutyl, sec-butyl, tert-butyl, carboxymethyl, β-carboxyethyl, β-carboxypropyl, methoxycarbonylmethyl, ethoxycarbonylmethyl, β-methoxyethyl, β-ethoxyethyl, β-methoxypropyl, β-chloroethyl, γ-bromopropyl, β-hydroxyethyl, β-hydroxybutyl, β-cyanoethyl, sulfomethyl, β-sulfoethyl, aminosulfonylmethyl and β-sulfatoethyl. $R_1$ and $R_2$, independently of one another, are preferably hydrogen, methyl or ethyl.

$X_1$ and Y are preferably fluorine or chlorine.

The radical $B_1$ contains 1 to 6, preferably 1 to 4, carbon atoms; examples of $B_1$ are: methylene, ethylene, propylene, butylene, methyleneoxy, ethyleneoxy, propyleneoxy and butyleneoxy. $B_1$ as a radical —O—(CH$_2$)$_n$— is bound to the benzene ring via an oxygen atoms. $B_1$ is preferably a direct bond.

β-Halogenoethyl Z' is in particular a β-chloroethyl radical and β-acyloxyethyl Z' is in particular a β-acetoxyethyl radical. The alkylene radical alk is preferably methylene, ethylene, methylmethylene, propylene or butylene. The substituent T as an acyloxy radical is in particular acetyloxy, propionyloxy or butyryloxy, and as an alkoxycarbonyl radical is in particular methoxycarbonyl, ethoxycarbonyl or propyloxycarbonyl. An alkyl radical V can be methyl, ethyl, propyl, isopropyl, butyl, isobutyl, sec-butyl or tert-butyl. Derivatives of the carboxyl or sulfo group are, for example, carbamoyl, N-methyl-, N-ethyl-, N,N-dimethyl- or N,N-diethylcarbamoyl, cyano, acetyl, propionyl, butyryl, methoxycarbonyl, ethoxycarbonyl, propyloxycarbonyl, sulfamoyl, N-methyl-, N-ethyl-, N,N-dimethyl- and N,N-diethylsulfamoyl, methylsulfonyl, ethylsulfonyl and propylsulfonyl, The radical $R_5$ is, for example, methyl, ethyl, propyl, isopropyl, butyl, isobutyl, sec-butyl, tert-butyl, pentyl or hexyl, or preferably hydrogen. The polymethylene radicals alk' are preferably ethylene, propylene or butylene. The indices m, p and q, independently of one another, are preferably 2, 3 or 4.

Examples of possible substituents of benzene rings I and II or of benzene or naphthalene ring III are the substituents mentioned for D and D'.

Suitable dyes are in particular dyes of the formulae

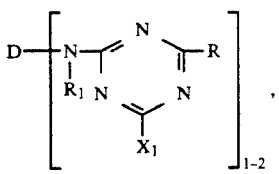 (38)

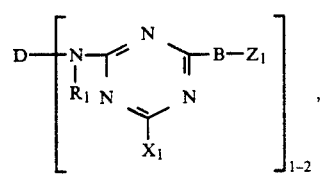 (39)

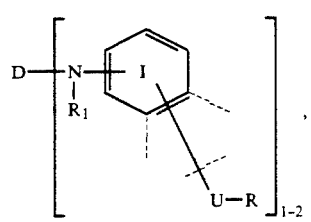 (40)

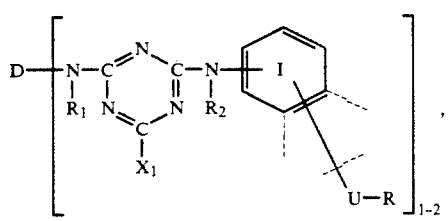 (41)

(R—U)—D—(Z₁), (42)

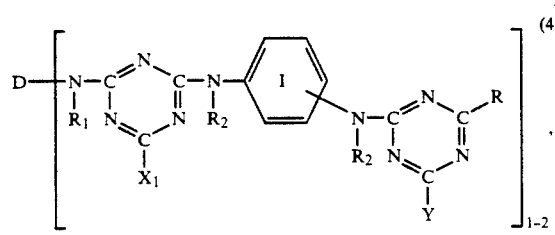 (43)

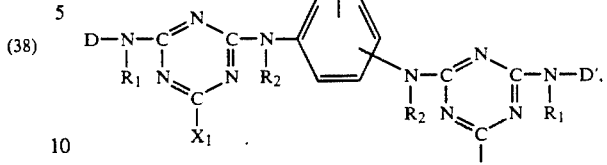 (44)

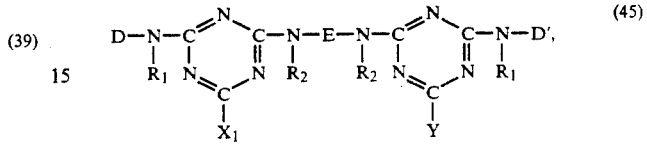 (45)

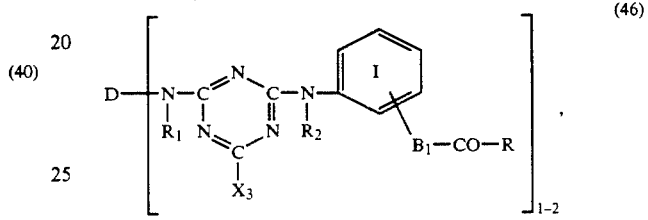 (46)

in which D, D', $R_1$, $R_2$, R, B, $B_1$, E, U, $X_1$, Y, Z, $Z_1$ are as defined and $X_3$ is a radical of the formula (34a) or (34b).

A commercial form comprising at least one dye of the formula (12), preferably a dye of the formula

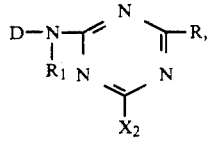 (47)

in which D, $R_1$ and R are as defined under formula (38) and $X_2$ is fluorine or chlorine is of very particular importance.

Examples of suitable dyes of the formula (47) are:

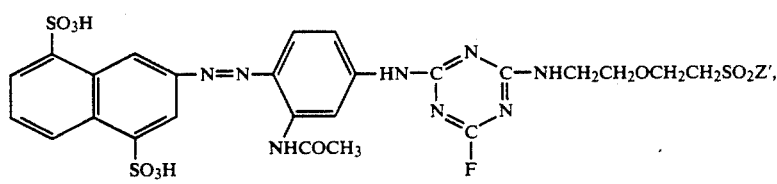 (48)

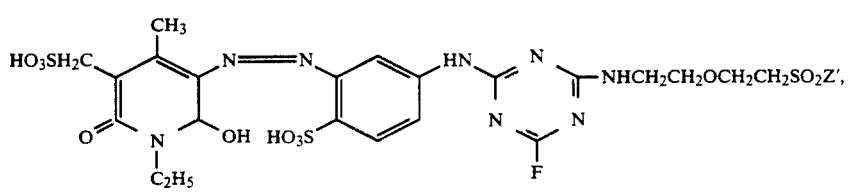 (49)

-continued
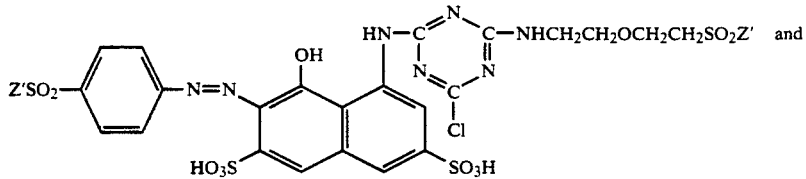 (50)
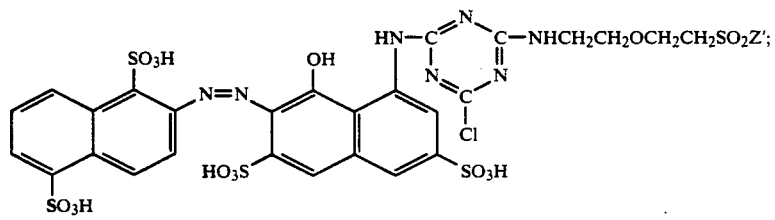 (51)
Further important dyes have the formulae
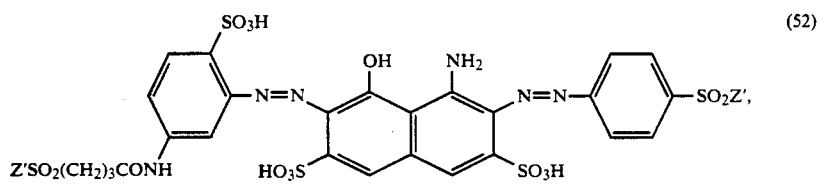 (52)
in which Z' in the formulae (48) to (52) is vinyl, β-sulfatoethyl or β-chloroethyl.
Interesting dyes of the formula (1) have the formulae
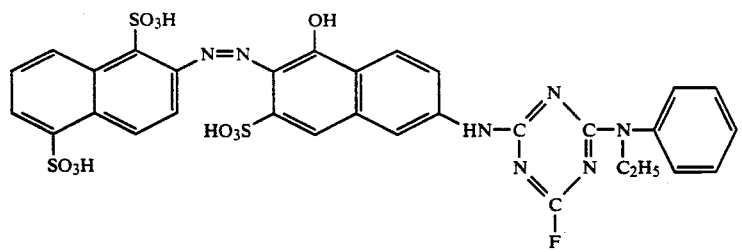 (53)
and
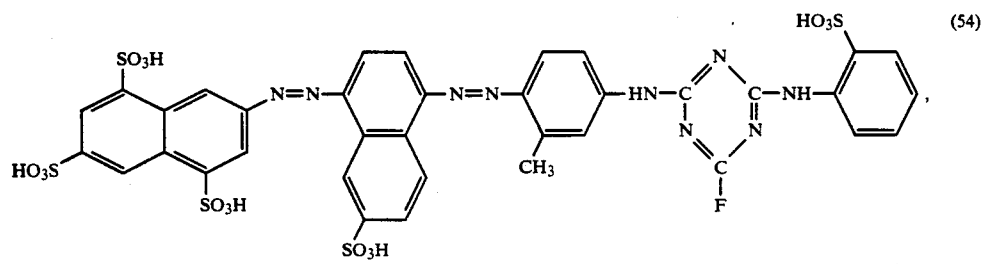 (54)

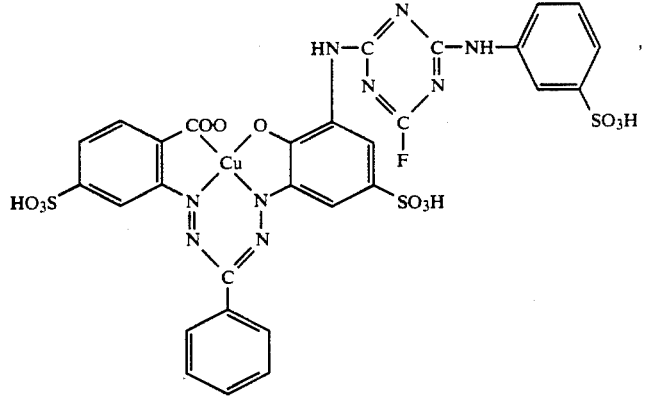
(55)
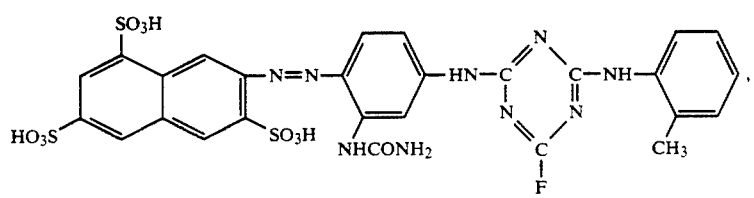
(56)
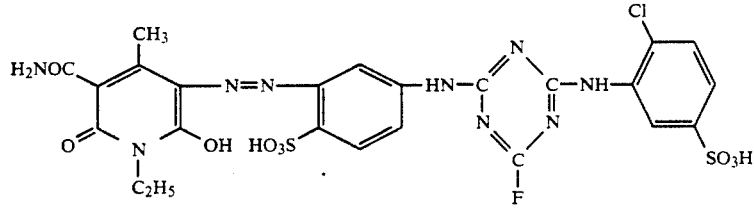
(57)
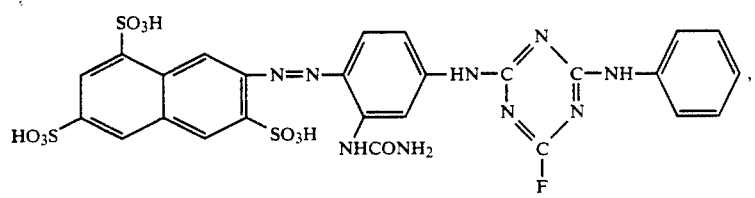
(58)
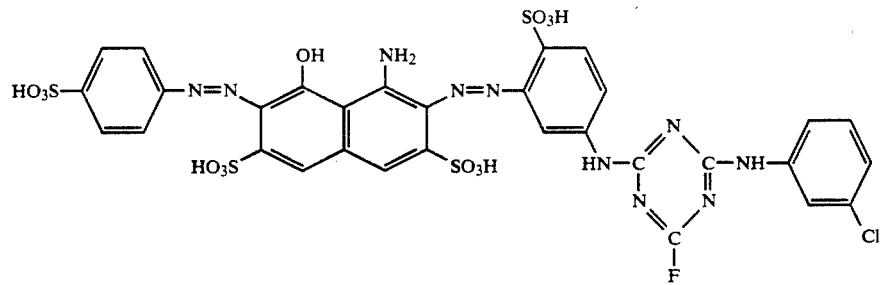
(59)
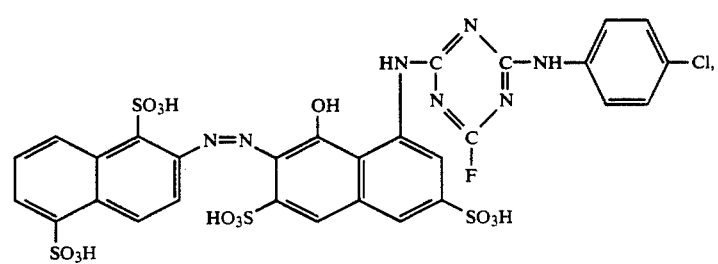
(60)

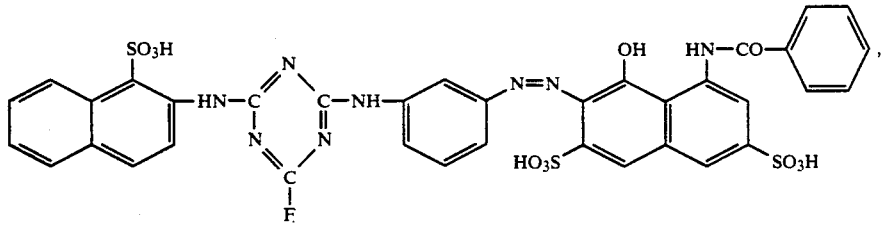

(61)

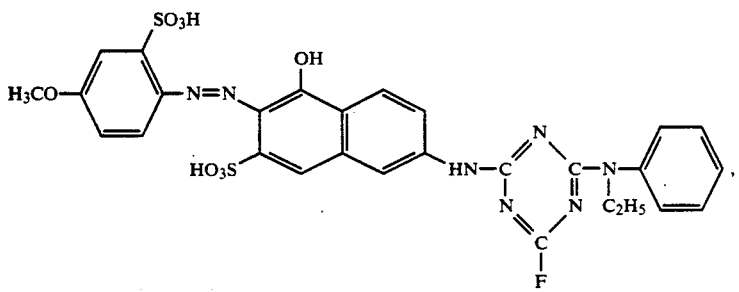

(62)

The commercial form according to the invention furthermore has a polyvinyl alcohol content of, preferably, 0.2 to 5 percent by weight, in particular 0.5 to 1.5 percent by weight of the amount of dye used.

Furthermore, the polyvinyl alcohol envelope of the commercial form according to the invention comprises, in addition to the fibre-reactive dyes, 0 to 50 percent by weight, in particular 0 to 30 percent by weight, preferably 0 to 5 percent by weight, of a diluent. Suitable diluents are: $Na_2SO_4$, NaCl, dextrin, dispersants and fillers. Furthermore, it is in many cases advantageous to add a pH buffer or a pH buffer mixture to the commercial form. Examples of suitable buffers are: $Na_2HPO_4$, $NaH_2PO_4$, sodium tripolyphosphate, sodium acetate and sodium citrate. The commercial form according to the invention preferably contains no further additives.

The commercial form according to the invention preferably contains partially or fully desalted dyes, for example dyes obtainable by reverse osmosis. Fully desalted dyes are to be understood as meaning those containing between 0.05 percent by weight and 5 percent by weight of salt.

The procedure for preparing the commercial form according to the invention is such, for example, that the crude dye obtainable from the preparation process is concentrated and desalted, for example by means of reverse osmosis, pH buffer and, if desired, diluent are added, the mixture is then, if desired, filtered until a clear solution is obtained, preferably by means of microfiltration, and is then dried and made into the commercial form by means of atomisers, for example nozzle atomisers. The dye powder obtained is metered through a volumetric feeding device known per se into a polyvinyl alcohol film in the form of a bag, which is then sealed.

The commercial form according to the invention can be produced in a wide range of pack sizes. Thus, envelopes (bags or sacks) made of polyvinyl alcohol and having a weight of up to 100 kg, in particular up to 60 kg, have proved to be suitable. Envelopes having a weight of, for example, 60 kg or 100 kg are advantageously filled in a container (for example cardboard or drum) in order to prevent tearing of the envelopes.

A particularly preferred embodiment of the novel commercial form is one in which a low-air polyvinyl alcohol envelope sealed on all sides is prepared and used. With regard to the preparation process of the commercial form, this means that the air present in the envelope is sucked out before sealing the polyvinyl alcohol envelope. The advantage of this embodiment is that it is easier to use since the polyvinyl alcohol envelopes used can be evenly distributed in the aqueous bath and are not, as a result of air trapped inside, present at the surface of the bath, which could lead, for example, to difficulties or delays when the polyvinyl alcohol envelopes are dissolved.

The novel commercial form according to the invention can be used to dye or print the same materials as those suitable for unpacked dyes. The packs can be used directly for preparing the required liquors or printing pastes without removing the envelopes beforehand. They offer advantages, such as savings in time and skilled personnel, since no pre-taring is necessary but only a count of the packs; furthermore, they have a longer shelf life than the powders contained in them, since their more compact bulk has smaller areas subject to attack by damaging environmental effects than powders, which, for example, in the case of reactive dyes, can be of particular importance. Finally, a very considerable advantage is that no dust pollution takes place.

The use of polyvinyl alcohol as the envelope material leads to the additional advantage that the addition of polyvinyl alcohol to the dye bath has no adverse effect on the dye and its fastness properties.

The novel commercial form is suitable for the dyeing and printing of a wide range of textile fibre materials, such as silk, wool, polyamide fibres and polyurethanes, and in particular cellulose-containing fibre materials of any type, and leather. Examples of fibre materials of this type are natural cellulose fibres, such as cotton, linen and hemp, and cellulose and regenerated cellulose. The novel commercial form is also suitable for the dyeing or printing of hydroxyl-containing fibres contained in blended fabrics, for example cotton/polyester fibre or cotton/polyamide fibre blends The process for the dyeing of textile fibre materials using the monoreactive or polyreactive dyes comprises dipping water-soluble polyvinyl alcohol envelopes sealed on all sides, in particular low-air envelopes, comprising the abovementioned monoreactive or polyreactive dyes into an aqueous dye bath and, after dissolution of the envelopes, distributing the dyes evenly and then dyeing a textile fibre material in a manner known per se.

A preferred embodiment for the dyeing of textile fibre materials using the commercial form according to the invention comprises allowing the polyvinyl alcohol envelopes containing the dye powder to swell in from half to three quarters of the amount of water required then dissolving the envelopes and the dye at room temperature (20° to 25° C.) to elevated temperature (at most 100° C.) by vigorous stirring and then adding the remaining water in order to dissolve the remainder of the polyvinyl alcohol envelopes.

A particularly preferred embodiment for the dyeing of textile fibre materials using the commercial form according to the invention comprises partially or completely dissolving the polyvinyl alcohol envelopes containing the dye in a separate bath and then transferring the solution to a bath suitable for dyeing.

In the case of high dye concentrations, when several polyvinyl alcohol envelopes containing dye have to be dissolved, it may happen that some of the water-soluble envelopes adhere to one another and dissolve too slowly or incompletely. Even by heating the solution, this disadvantage can in many cases be eliminated only unsatisfactorily. This incomplete or time-consuming dissolution process has an adverse effect on the dyeing process. Adhering dye powder residues can cause differences in concentration. The even distribution of the dye in the solution can be disrupted, as a result of which a uniform, reproducible dyeing process is not ensured in each case.

It is therefore urgently desired to eliminate these disadvantages. It is in particular desired to provide a process for the preparation of dye solutions which allows dust-free preparation of the dye solution. The dye packed in a polyvinyl alcohol envelope and its pack should dissolve without leaving any residue. It is also desired that the expenditure for cleaning the processing plant is significantly reduced and waste waters are substantially avoided by the process.

The present invention also relates to a process for the preparation of dye solutions from the commercial forms according to the invention, in which, depending on the desired amount of solution having a specified dye concentration, an amount of a pulverulent dye (C) is dissolved in a specified amount of a solvent (S), in particular in water, which comprises introducing the pulverulent, water-soluble monoreactive dye (C) which contains a monofluoro-s-triazine radical and/or at least one water-soluble polyreactive dye (C) in a polyvinyl alcohol envelope (B) into a make-up container (1), mixing the entire amount of dye with about $\frac{1}{2}$–$\frac{3}{4}$ of the amount of the solvent in the make-up tank (1), recirculating the dye/solvent mixture by means of a recirculation pump (2) in a line system (3) connected to the make-up tank (1) until the dye (C) is completely dissolved, pumping this first solution in a collecting tank (6) which is linked to the line system (3) via a three-way valve device (4), and recirculating the remaining amount of solvent in the line system (3) and the make-up tank (1) in order to clean it, before passing it to the collecting tank (6), in order to set the dye solution to the desired dye concentration, and mixing it with the first solution.

Preferred embodiments of the process according to the invention comprise introducing a) the polyvinyl alcohol envelopes (B) containing the dye automatically or manually into the make-up tank (1);

b) using a comminution pump as the recirculation pump (2);

c) introducing the dye/solvent mixture approximately tangentially and at an angle $\alpha$ of at most about 45° relative to the surface of the liquid from the line system (3) into the upper region of the make-up tank (1);

d) removing the dye/solvent mixture at the lowest level of the make-up tank (1) by suction;

e) monitoring and controlling the addition of dye (C), the addition of solvent (S), the dye concentration, and the recirculation pump (2) and control values (4) disposed in the line system (3) by means of a control unit (11).

Figure 2:
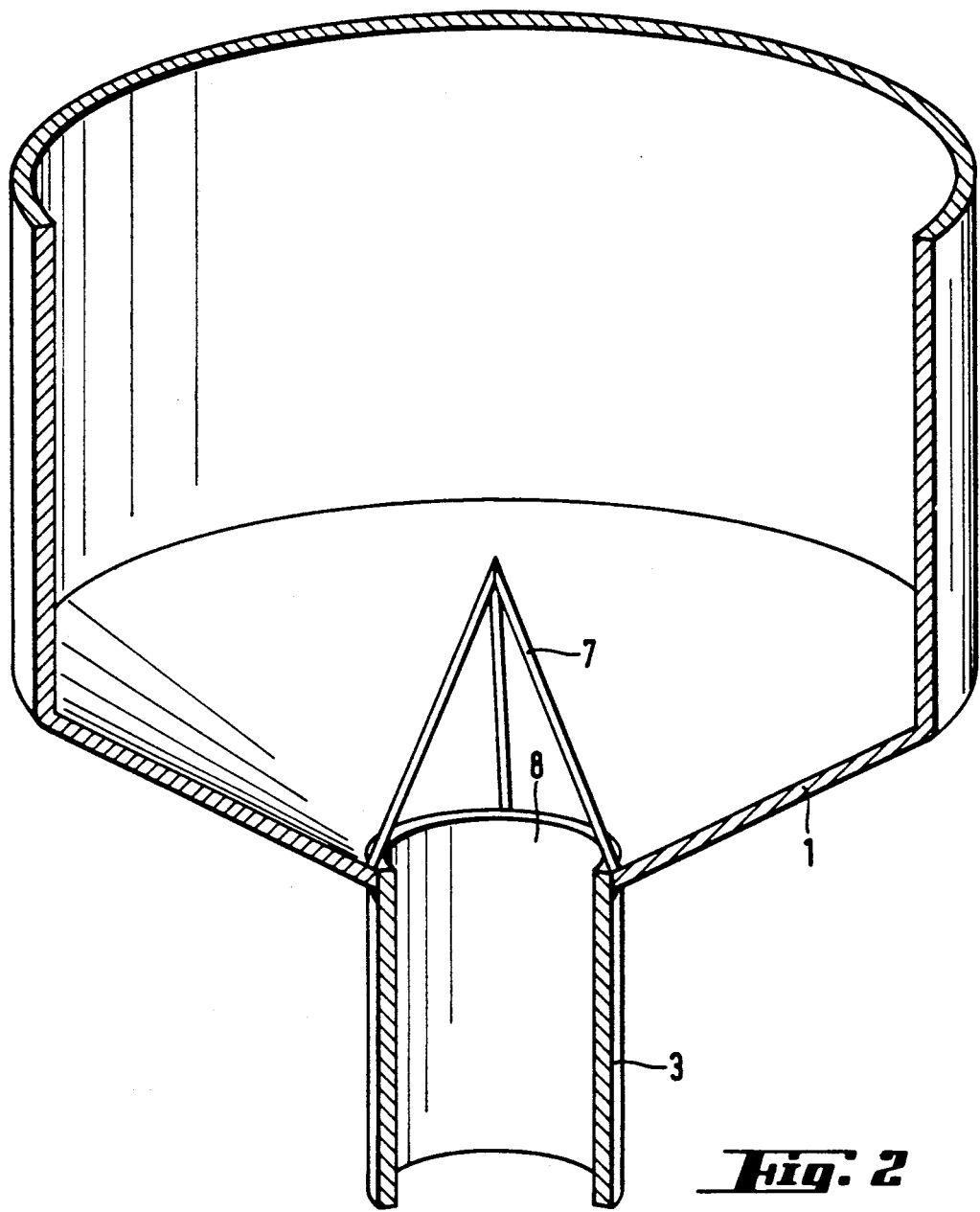

The invention is illustrated in more detail by means of the illustrative drawings below. In a partially diagrammatic representation:

FIG. 1 shows a first exemplary embodiment of an apparatus for the process according to the invention, FIG. 2 shows the region of the discharge opening, designated as 8 in FIG. 1, on a larger scale.

The apparatus for carrying out the process according to the invention shown in FIG. 1 by way of example comprises a preferably cylindrical make-up tank 1 which can be closed by means of a removable lid 10. The bottom of the make-up tank 1 tapers off in approximately conical form. At its deepest point, the tank 1 is provided with a discharge opening 8 which opens into a line system 3. Above the discharge opening 8, a cover element 7 provided with flowholes is disposed in the tank 1. The cover element 7 is preferably designed as a tripod pointing upwards, as shown in FIG. 2. The line system 3 ends in the upper region of the make-up tank 1, which makes for a closed cycle of make-up tank 1 - line system 3 - make-up tank 1. Following the make-up tank 1, a recirculation pump 2 is integrated into the line system 3. In the exemplary embodiment shown, the recirculation pump 2 is preferably designed as a comminution pump. The recirculation pump 2 is followed by a concentration-measuring device 26 in the line system. A branching line 5 leads from a three-way valve 4 also provided in the line system 3 to a collecting tank 6, if desired via a sieve disposed in the branching line 5. The opening 9 of the line system 3 in the upper region of the make-up tank 1 ideally extends approximately tangentially along the side wall of the tank. It is preferably inclined at an angle $\alpha$ of at most about 45° with respect to the horizontal. The recirculation pump 2, the concentration-measuring device 26 and the three-way valve device 4 are preferably connected to a control unit 11 via control lines 27, 28 and 29. The control unit 11 monitors and controls the operation of the pump 2 and the valve 4. It is simultaneously also connected to a solvent source 14 and provides the make-up tank with solvent S, preferably with water, via a delivery line 12 connected to the make-up tank 1. Advantageously, the opening of the delivery line 12 also extends approximately tangentially along the tank wall and is inclined towards the horizontal. In the delivery line 12, a flow-rate counter 13 is arranged, which transmits the required measured data on the amount of solvent to the control unit. A stirrer 15, which is also connected to the control unit 11 via a control line 30 and is monitored and controlled in this manner, can additionally be present in the collecting tank 6, as shown.

To prepare a dye solution of a specified dye concentration, solvent S, preferably water, in the amount desired is poured into the make-up tank 1 via the delivery line 12. During this, care is taken that initially only $\frac{1}{2}$–$\frac{3}{4}$ of the amount of solvent are poured into the make-up tank 1. After the manual or automatic removal of the lid 10, the total required amount of the pulverulent dye C in polyvinyl alcohol envelopes B is added. For example, envelopes containing ½, 1, 3 and more kg of dye powder can be present. The required amount of dye envelopes is added to make-up tank 1 manually or automatically, and the tank 1 is again closed with its lid 10. By activating the recirculation pump 2, the solvent L is sucked from the make up tank 1 through the discharge opening 8 into the line system 3 and is again introduced into the make-up tank 1 at the inlet opening 9. The tangential arrangement of the opening 9 at the side wall of the tank 1 has the effect that the solvent L is introduced tangentially and thus produces a circular flow in the solvent portion in the make-up tank 1. As a result of the inclination of the opening 9 with respect to the horizontal at an angle $\alpha$ of at most about 45°, in addition to the torque, a moment directed vertically towards the tank bottom is also imparted to the solvent portion. In this manner, the solvent L present in the tank 1 is very thoroughly mixed. The dye envelopes B slowly dissolve in the solvent L and release the dye powder C. The cover element 7, which is preferably designed in the form of a pointed tripod, prevents the envelopes from clogging the outlet opening 8. The pointed design of the tripod has the advantage that the dye envelopes B admitted to the tank 1 are torn by it, and the dye powder C is released more rapidly in this manner. The dye powder/-solvent mixture is recirculated until the powder C has completely dissolved. Undissolved envelope residues sucked off through the discharge opening 8 are torn into small pieces in the recirculation pump, as a comminution pump, as a result of which they can be dissolved much more easily. The dye concentration in the first solution can be determined by means of the concentration-measuring device 26. The measured values are transmitted to the control unit 11. If the concentration corresponding to the amount of dye and solvent used is reached, the concentration-measuring device displays the complete dissolution of the dye powder C and the dissolvable polyvinyl alcohol envelopes B; the three-way valve 4 is actuated, and the first solution is pumped into the collecting tank 6 via the branching line 5. The first dye solution is homogenised still further by means of the stirrer 15 arranged in the collecting tank. The remaining amount of solvent is then introduced into the make-up tank 1 and, after reversing the three-way valve device 4, is circulated in the line system 3 and the tank 1. In this manner, the remaining solvent is used as cleaning agent. The cleaning process is monitored by means of the concentration-measuring device 26. When the measured concentration values no longer change or change only significantly, the three-way valve device 4 is again switched to allow passage into the branch line 5. The solvent residue to which dye solution residues have been added is then introduced into the collecting tank 6 via the branch line 5 and there mixed with the first solution, in order to prepare the desired amount of dye solution in the desired concentration.

The process according to the invention and the apparatus allow substantially dust-free processing of the commercial form according to the invention. The apparatus for preparing dye solutions is cleaned using a portion of the required solvent S. The resulting contaminated solvent is used for setting the dye concentration to the desired value and thus does not constitute an effluent which has to be disposed of. In the alternative embodiment discussed with the aid of FIG. 1, the pulverulent dye C is added in the form of polyvinyl alcohol envelopes B. The dye C and the envelope material, a polyvinyl alcohol, completely dissolve, and no residues contaminated with small amounts of dye powder remain. The process operation discussed by way of example with the aid of FIG. 1 is highly suitable for reactive dyes, in particular for highly reactive dyes. Examples of dyes of this type are the dyes mentioned under the commercial form according to the invention. The same preferences as mentioned for the commercial form according to the invention apply to the dyes used in the process according to the invention.

Further interesting embodiments of the process according to the invention for the dyeing of textile fiber materials using the commercial form according to the invention, in particular for the trichromatic dyeing, are those in which the dye-containing polyvinyl alcohol envelopes are not introduced to the dye bath or the dye liquor directly but instead stock solutions are prepared, for example in accordance with the process according to the invention for preparing a dye solution, and this stock solution is added to the dye bath, the dye liquor, the printing paste or to an upstream storage tank. A stock solution is to be understood, for example, as meaning an aqueous solution containing 1 to 30, in particular 10 to 15, percent by weight of dye. A stock solution allows precision metering of the dyes. In continuous dyeing processes, for example in the padding process, it is advantageous to prepare stock solutions, to mix, if desired, different stock solutions in a storage tank and to supplement the liquor solution with this mixture which may additionally contain further customary additives. A further advantage of the use of stock solutions is that only a few pack sizes are necessary. If required, a portion of the required amount of dye can be added to the dye bath in the form of polyvinyl alcohol envelopes, for example during exhaust-dyeing, and the remainder of the required amount of dye can be added to the dye bath in the form of a stock solution.

The dyes used in the commercial form according to the invention are present either in the form of their free acids or preferably as their salts.

Examples of suitable salts are the alkali metal salts, alkaline earth metal salts or ammonium salts or the salts of an organic amine. Examples are sodium salts, lithium salts, potassium salts or ammonium salts of the salt of triethanolamine.

The examples which follow serve to illustrate the invention. Therein, parts and percentages are by weight. Temperatures are given in degrees centigrade. Parts by weight relate to parts by volume as the gram relates to the cubic centimeter.

EXAMPLE 1

The dye of the formula

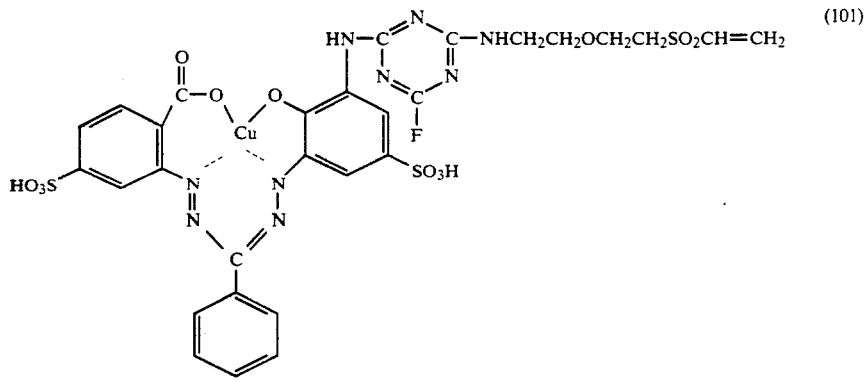
(101)

is, as described in EP-A-333 656, Example 83, desalted, concentrated and made into powdered granules by spray-drying. The powder is then packed into bags made of a 35 μm thick water-soluble polyvinyl alcohol envelope by heat-sealing, keeping the air content of the bags low by means of suction before the heat-sealing. 100 g, 500 g, 1 kg, 2 kg, 4 kg and 20 kg bags are produced comprising 0.5 to 1.5 percent by weight of polyvinyl alcohol and 98.5 to 99.5 percent by weight of dye.

To prepare dye baths, the dye bags obtained can be dissolved directly in water without removing the polyvinyl alcohol envelope or bringing it into solution by special measures. The baths thus prepared can, if appropriate after addition of the other desired dyeing assistants, be used to dye cotton in a manner known per se in blue shades having good fastness properties.

Dye bags which are directly soluble in water and dye cotton in the hue given are also obtained by packing one of the following dyes into bags made of polyvinyl alcohol envelopes instead of the dye of the formula (101).

| Dye | Hue |
|---|---|
| 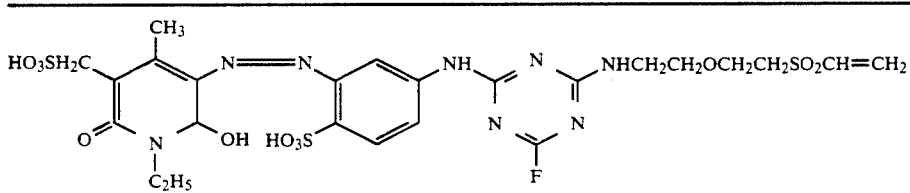 | (102) yellow |
| 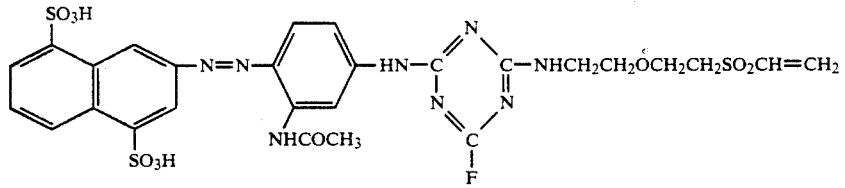 | (103) yellow |
| 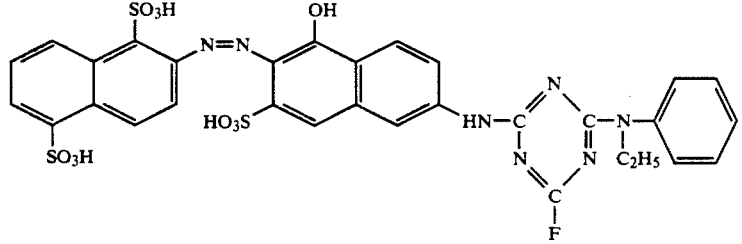 | (104) orange |
| 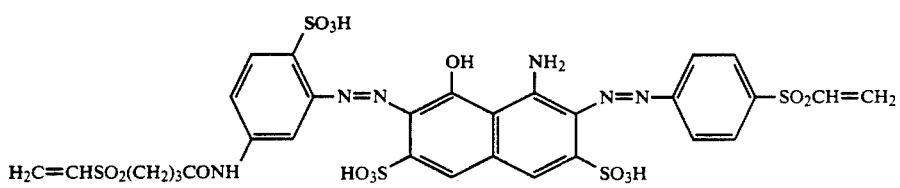 | (105) navy |

| Dye | Hue |
|---|---|
| (structure) | (106) red |
| (structure) | (107) red |
| (structure) | (108) brown |
| (structure) | (109) |
| (structure) | (110) |
| (structure) | (111) |

| Dye | Hue |
|---|---|

(112) [chemical structure: naphthalene with SO₃H groups, azo link to phenyl bearing NHCONH₂, connected via HN to fluorotriazine with NH-phenyl]

(113) [chemical structure: disazo dye with HO₃S-phenyl-N=N-naphthol(SO₃H)(NH₂)-N=N-phenyl(SO₃H) linked through HN to fluorotriazine with NH-(3-chlorophenyl)]

(114) [chemical structure: naphthalene(SO₃H)₂-N=N-naphthol(SO₃H)₂ linked via HN to fluorotriazine bearing NH-(4-chlorophenyl)]

(115) [chemical structure: naphthyl(SO₃H)-NH-fluorotriazine-NH-phenyl-N=N-naphthol(SO₃H)₂ with HN-CO-phenyl (benzamido) group]

(116) [chemical structure: H₃CO-phenyl(SO₃H)-N=N-naphthol(SO₃H)-NH-fluorotriazine with N(C₂H₅)(phenyl) substituent]

EXAMPLE 2

A bleached cotton cretonne fabric is impregnated on a pad-mangle to a liquor pickup of 70% with a padding liquor of the following composition:

100 l of each liquor solution:
1 100 g bag of the dye of the formula (103) packed according to Example 1,
1 500 g bag of the dye of the formula (107) packed according to Example 1, and
8 100 g bags of the dye of the formula (101) packed according to Example 1, 1000 g of a thickener,
100 g of a wetting agent, and
200 g of the sodium salt of m-nitrobenzenesulfonic acid.
The dipping time is 2 seconds.

After padding, the cotton cretonne fabric is dried at 100° C. for one minute, padded with a liquor containing 250 g/l of NaCl and 10 ml/l of 30% NaOH to a liquor pickup of about 80% and then fixed in saturated stream at 101° to 103° for one minute.

The cotton cretonne fabric is then rinsed first with cold water and then with hot to boiling water, soaped at the boil with 1 to 2 g/l of a detergent, again rinsed with hot and then with cold water and then dried, giving an olive dyeing which is level from end to end and has good fastness properties.

EXAMPLE 3

A bleached, mercerised cotton cretonne fabric is impregnated on a pad-mangle to a liquor pickup of 70% with a padding liquor of the following composition:
per 100 l of liquor solution:
2 500 g bags and 2 100 g bags of the dye of the formula (104) packed according to Example 1,
4 500 g bags of the dye of the formula (106) packed according to Example 1,
10 kg of urea,
1 kg of calcined sodium carbonate and
100 g of a wetting agent.
The dipping time is 2 seconds.
The padded fabric is then dried at 120° on a hot flue dryer for 1 minute and then subjected to dry heat setting at 160° on the hot flue dryer for 1 minute.
Rinsing, soaping, rinsing and drying in accordance with the procedure of Example 2 gives a cotton cretonne fabric dyed levelly from end to end in an orange-red hue having good fastness properties.

EXAMPLE 4

A bleached knitted cotton fabric is impregnated on a pad-mangle to a liquor pickup of 70% with a padding liquor of the following composition:
per 100 l of liquor solution:
1 1000 g bag and 1 500 g bag formula (103) packed according to Example 1,
1 1000 g bag of the dye of the formula (106) packed according to the Example 1,
2 1000 g bags of the dye of the formula (105) packed according to Example 1,
100 g of a wetting agent,
7 l of a 33% waterglass solution and
2.5 l of a 30% sodium hydroxide solution.
The dipping time is 2 seconds.
The padded fabric is then packed airtight in a plastic film and stored at 25° C. for 26 hours.
The knitted cotton fabric is then rinsed first with cold water and then with hot to boiling water, soaped at the boil with 1 to 2 g/l of a detergent, again rinsed with hot and then with cold water and then dried, giving a beige dyeing which is level from end to end and has good fastness properties.

EXAMPLE 5

A polyester viscous fabric is impregnated on a pad-mangle to a liquor pickup of 55% with a padding liquor of the following composition:
per 100 l of liquor solution:
1 1000 g bag and 2 100 g bags of the dye of the formula (106) packed according to Example 1,
800 g of the dye of the formula

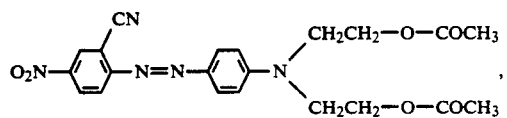

1000 g of a thickener and
100 g of a wetting agent.
The pH is brought to 6 with acetic acid.
After padding, the fabric is dried in a hot flue dryer at 120° C. for one minute, then thermosoled at 210° C. for one minute, and then padded with a liquor comprising 250 g/l of NaCl and 10 ml/l of a 30% sodium hydroxide solution to a liquor pickup to 60%. It is then fixed in saturated steam at 101° to 103° C. for one minute.
Rinsing, soaping, rinsing and drying in accordance with Example 2 gives a solid red dyeing of the polyester viscose fabric.

EXAMPLE 6

1 500 g bag of the dye of the formula (110) packed according to Example 1,
8 100 g bags of the dye of the formula (114) packed according to Example 1,
3 100 g bags of the dye of the formula (109) packed according to Example 1,
1 kg of the sodium salt of m-nitrobenzensulfonic acid and 50 kg of NaCl
are dissolved in 200 l of cold water. To this dye bath is introduced 10 kg of knitted cotton fabric. The temperature is increased to 50° C., and the fabric is dyed at this temperature for 45 minutes. 1 kg of calcined sodium carbonate and 400 ml of 30% NaOH solution are then added at 50° C., and the fabric is fixed at 50° C., for 25 minutes. The knitted cotton fabric is then rinsed, soaped, rinsed and dried in accordance with the procedure of Example 2, giving a beige knitted cotton fabric.

EXAMPLE 7

12 1 1 kg bags of the dye of formula (103) packed according to Example 1 are dissolved in a storage tank in 88 g of water at room temperature. The dyes of the formulae (107) and (101) are dissolved in the same manner in one storage tank each.
A bleached cotton cretonne fabric is impregnated on a pad-mangle to a liquor pickup of 70% with a padding liquor of the following composition:
per 100 l of liquor solution:
1 kg from the storage tank containing the dye of the formula (103),
5 kg from the storage tank containing the dye of the formula (107) and
8 kg from the storage tank containing the dye of the formula (101),
1000 g of a wetting agent and
100 g of a wetting agent and
200 g of the sodium salt of m-nitrobenzenesulfonic acid.
The dipping time is 2 seconds.
After padding, the cotton cretonne fabric is dried at 100° C. for one minute, padded with a liquor comprising 250 g/l of NaCl and 10 ml/l of 30% NaOH solution to a liquor pickup of about 80% and is then fixed in saturated steam at 101° to 103° C. for one minute.
The cotton cretonne fabric is then rinsed first with cold water and then with hot to boiling water, soaped at the boil with 1 to 2 g/l of a detergent, again rinsed with hot and then with cold water and then dried, giving an olive dyeing which is level from end to end and has good fastness properties.

EXAMPLE 8

The dye of the formula (104) is dissolved in a storage tank in the same manner as described in Example 7.
A bleached, mercerised cotton cretonne fabric is impregnated on a pad-mangle to a liquor pickup of 70% with a padding liquor of the following composition:
per 100 l of liquor solution:

2 kg from the storage tank containing the dye of the formula (104),
2 500 g bags of the dye of the formula (104) packed according to Example 1,
4 500 g bags of the dye of the formula (106) packed according to Example 1,
10 kg of urea,
1 kg of calcined sodium carbonate and
100 g of a wetting agent.

The dipping time is 2 seconds.

The padded fabric is then dried on a hot flue dryer at 120° for 1 minute and then subjected to dry heat setting at 160° in a hot flue dryer for 1 minute.

Rinsing, soaping, rinsing and drying in accordance with the procedure of Example 2 gives a cotton cretonne fabric which has been dyed levelly from end to end in an orange-red hue and has good fastness properties.

EXAMPLE 9

800 g of a stock thickener comprising, per kg, 520 g of a 6% sodium alginate thickener solution, 125 g of urea, 25 g of sodium carbonate, 12.5 g of the sodium salt of m-nitrobenzenesulfonic acid, 4 g of a 40% aqueous formaldehyde solution and 313.5 g of water are initially introduced, 50 g of the dye of the formula (107) packed according to Example 1 into 5 10 g bags are placed on top and 150 g of water are then poured over it. The dye bags over which the water has been poured dissolve after about 3 to 5 minutes and then sink into the initially introduced stock thickener. The stock thickener is then stirred together with the dye and the added water by means of a high-speed stirrer.

The printing paste thus obtained is used to print a cotton fabric in the usual manner (planographic or rotary film printing or roller printing), which is then dried and fixed with saturated steam for 5 minutes. The printed fabric is then rinsed and subsequently dried, giving a red print.

EXAMPLE 10

Preparation of a stock solution 50 l of water are initially introduced into a make-up tank [(1) in FIG. 1]. 24 1 kg bags of the dye of the formula (103) packed according to Example 1 are placed in the make-up tank. After about 3 minutes, the recirculation pump [(2) in FIG. 1] is switched on and allowed to run for 15 minutes. 26 l of water are then added, and the mixture is recirculated [make-up tank (1) - line system (3) - make-up tank (1) in FIG. 1] for another 15 minutes until the dye has completely dissolved. This solution is then pumped to a collecting tank [(6) in FIG. 1] via a three-way valve [(4) in FIG. 1], giving 100 kg of a highly concentrated dye solution which can be used for preparing dye liquors or printing pastes.

An identical dye solution is obtained by using one 24 kg bag instead of 24 1 kg bags of the dye of the formula (103).

What is claimed is:

1. A commercial package comprising a water-soluble polyvinyl alcohol envelope which is sealed on all sides, having enclosed therein a stable, dust-free, water-soluble reactive dye selected from the group consisting of
   (1) monoreactive dyes of formula

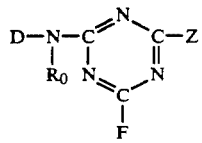
(1)

in which D is the radical of an organic dye from the monoazo or polyazo, metal complex azo, anthraquinone, phthalocyanine, formazan, azomethine, nitroaryl, dioxazine, phenazine, stilbene, triphenylmethane, xanthene, thioxanthone, naphthoquinone, pyrenequinone or perylenetetracarbimide series, $R_0$ is hydrogen or substituted or unsubstituted $C_1$-$C_4$alkyl, and Z is a substituted or unsubstituted amino group, a substituted or unsubstituted mercapto group, a substituted or unsubstituted hydroxyl group, or a substituted or unsubstituted hydrocarbon radical and
   (2) polyreactive dyes of formula

(2)

in which D is the radical of an organic dye from the monoazo or polyazo, metal complex azo, anthraquinone, phthalocyanine, formazan, azomethine, nitroaryl, dioxazine, phenazine, stilbene, triphenylmethane, xanthene, thioxanthone, naphthoquinone, pyrenequinone or perylenetetracarbimide series, and $-(X)_{2-4}$ is 2,3 or 4 fiber-reactive radicals X, which can be identical to or different from one another, from the aliphatic, aromatic or heterocyclic series, which are bound to D directly or via a bridging member, the air content of the package being kept low by means of suction before sealing.

2. A commercial package according to claim 1, comprising at least one dye of the formula (1), in which Z is —$NH_2$, $C_1$-$C_4$alkylamino, N,N-di-$C_1$-$C_4$alkylamino, phenylamino, N—$C_1$-$C_4$alkyl-N-phenylamino or naphthylamino, in which the alkyl radicals can be substituted by $C_1$-$C_4$alkoxy, cyano, halogen, hydroxyl, sulfo or sulfato, and the phenyl or naphthyl radical can be substituted by $C_1$-$C_4$alkyl, $C_1$-$C_4$alkoxy, halogen, carboxyl or sulfo, or in which Z is morpholino.

3. A commercial package according to claim 1, comprising at least one dye of the formulae

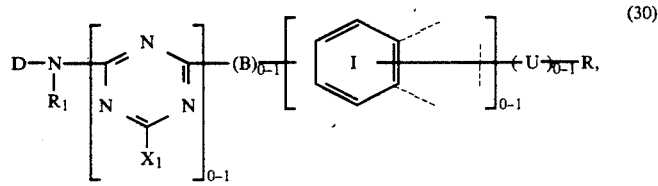
(30)

(31)

-continued

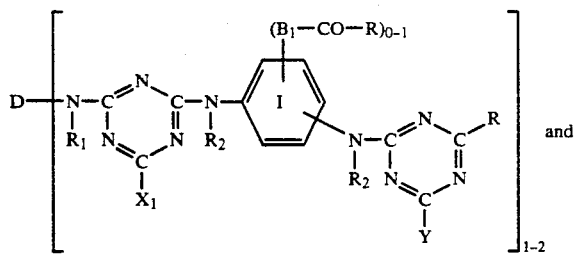
(32)

and

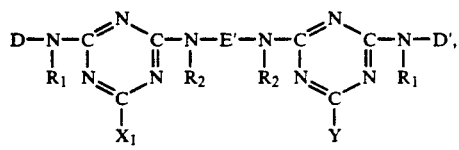
(33)

in which D and D', independently of one another, are each the radical of an organic dye from the monoazo, polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarbimide series, $R_1$ and $R_2$, independently of one another, are hydrogen, substituted or unsubstituted $C_1$–$C_4$alkyl or substituted or unsubstituted phenyl, $X_1$ and Y, independently of one another, are fluorine, chlorine, bromine, or a radical of the formulae

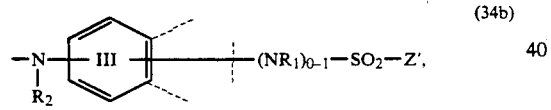
(34a)

or

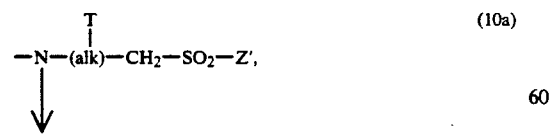
(34b)

B is a radical of the formula

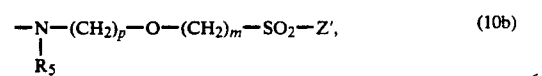

$A_1$ is an aliphatic or aromatic bridging member, such as mentioned for $A_2$ and $A_3$, U is —CO— or —SO$_2$—, $B_1$ is the direct bond $-(CH_2)_{1-6}$ or $-O-(CH_2)_{1-6}$, $Z_1$ is an aliphatic, aromatic or heterocyclic reactive radical, R is a radical of the formula

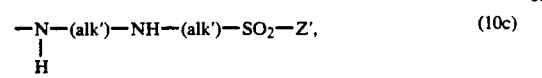
(10a)

↓

—N—(CH$_2$)$_p$—O—(CH$_2$)$_m$—SO$_2$—Z',  (10b)
|
R$_5$

—N—(alk')—NH—(alk')—SO$_2$—Z',  (10c)
|
H

-continued

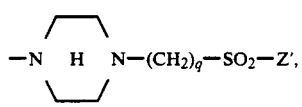
(10d)

Z' is β-sulfatoethyl, β-thiosulfatoethyl, β-acyloxyethyl, β-halogenoethyl or vinyl; alk is an alkylene radical having 1 to 6 C atoms or branched isomers thereof; T is hydrogen, chlorine, bromine, fluorine, hydroxyl, sulfato, acyloxy having 1 to 4 C atoms, cyano, carboxyl, alkoxycarbonyl having 1 to 5 C atoms, carbamoyl, or a radical —SO$_2$—Z', in which Z' is as defined above; $R_5$ is hydrogen or $C_1$–$C_6$alkyl; V is hydrogen or an alkyl radical having 1 to 4 C atoms, which can be substituted by carboxyl or sulfo groups or by derivatives thereof, alkoxy groups having 1 or 2 C atoms, halogen or hydroxyl; or a radical

(10e)

in which Z', alk and T are as defined; alk', independently of one another, are polymethylene radicals having 2 to 6 C atoms or branched isomers thereof; and m is 1 to 6, p is 1 to 6 and q is 1 to 6; n and n' are each the number 1 or 2 and n+n' is 2, 3 or 4, E' is a radical of the formula

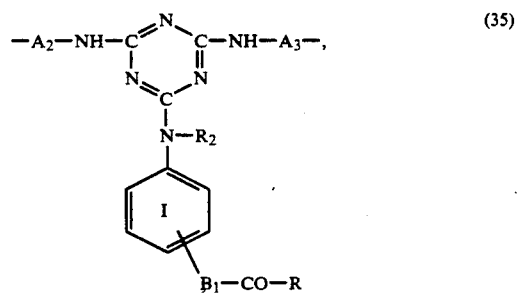
(35)

$A_2$ and $A_3$, independently of one another, are each a radical of the formula

(36a)

-continued

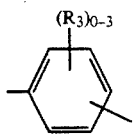
(36b)

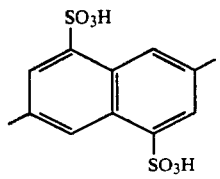
(36c)

or

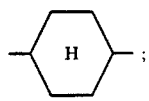
(36d)

or $X_1$ in formula (33) is a radical of the formula

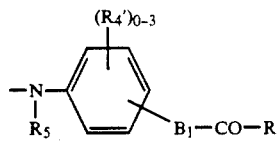
(37)

and E' is a radical of the formula (36a), (36b), (36c) or (36d); and $R_3$ and $R_{4'}$, independently of one another, are 0 to 3 substituents from the group comprising $C_{1-4}$alkyl, $C_{1-4}$alkoxy, halogen, carboxyl and sulfo;

and benzene rings I and II or benzene or naphthalene ring III, independently of one another, can contain further substituents.

4. A commercial package according to claim 3, comprising at least one dye of the formula

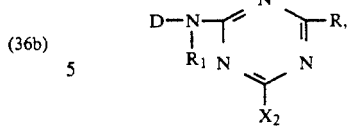
(47)

in which D, $R_1$ and R are as defined in claim 6 and $X_2$ is fluorine or chlorine.

5. A commercial package according to claim 1, wherein the polyvinyl alcohol content is 0.2 to 5 percent by weight of the amount of dye used.

6. A commercial package according to claim 1, wherein the polyvinyl alcohol envelope has a thickness of 25 to 40 μm.

7. A commercial package according to claim 1, wherein the polyvinyl alcohol envelope comprises, in addition to fiber-reactive dyes and optional cationic dyes, 0 to 10% by weight of sodium chloride, sodium sulfate, dextrin, dispersants, fillers and/or buffer salts or buffer salt mixtures.

8. A process for dyeing of textile fiber materials of silk, wool, synthetic polyamide, polyurethane or cellulose fibers, and leather using a monoreactive or polyreactive dye, which comprises dipping a water-soluble polyvinyl alcohol envelope sealed on all sides comprising a monoreactive or polyreactive dye according to claim 1 into an aqueous dye bath and, after dissolution of the envelope, distributing the dye evenly.

9. A process according to claim 8, wherein the air content of the water-soluble polyvinyl alcohol envelope, which is sealed on all sides, is kept low by means of suction before sealing.

10. A process for the preparation of a commercial package according to claim 1, which comprises enclosing a dye powder in a water-soluble polyvinyl alcohol envelope whose air content is kept low by means of suction before sealing.

11. A process according to claim 10, which comprises enclosing the polyvinyl alcohol envelope in a second air- and moisture-tight envelope.

12. A process according to claim 8, wherein the polyvinyl alcohol envelope which is sealed on all sides is dissolved in a separate bath and the solution is then transferred to the dye bath or the dye tank.

13. A process according to claim 8, wherein the polyvinyl alcohol envelope is present in the form of a bag.

* * * * *